United States Patent
Johnson et al.

(10) Patent No.: US 10,261,176 B2
(45) Date of Patent: Apr. 16, 2019

(54) ROTATING ATTITUDE HEADING REFERENCE SYSTEMS AND METHODS

(71) Applicant: FLIR Systems, Inc., Wilsonville, OR (US)

(72) Inventors: Mark Johnson, Vannes (FR); Paul Stokes, Fleet (GB); Richard Jales, Eastleigh (GB)

(73) Assignee: FLIR SYSTEMS, INC., Wilsonville, OR (US)

( * ) Notice: Subject to any disclaimer, the term of this patent is extended or adjusted under 35 U.S.C. 154(b) by 228 days.

(21) Appl. No.: 15/445,717

(22) Filed: Feb. 28, 2017

(65) Prior Publication Data
US 2017/0176586 A1    Jun. 22, 2017

Related U.S. Application Data

(63) Continuation of application No. PCT/US2015/047991, filed on Sep. 1, 2015, and a continuation-in-part of application No. 14/941,497, filed on Nov. 13, 2015, which is a continuation of
(Continued)

(51) Int. Cl.
| | |
|---|---|
| *G01C 17/38* | (2006.01) |
| *G01S 13/86* | (2006.01) |
| *G01S 13/89* | (2006.01) |
| *G01S 7/20* | (2006.01) |
| *G01S 15/89* | (2006.01) |

(Continued)

(52) U.S. Cl.
CPC .............. *G01S 13/86* (2013.01); *G01C 17/38* (2013.01); *G01S 7/20* (2013.01); *G01S 13/89* (2013.01); *G01S 13/9307* (2013.01); *G01S 15/025* (2013.01); *G01S 15/89* (2013.01)

(58) Field of Classification Search
CPC ........ G01C 17/38; G01C 21/16; G01C 21/20; G01C 21/18; G01S 13/865; G01S 13/862; G01S 13/86
USPC ............................... 33/356, 355 R, 357, 333
See application file for complete search history.

(56) References Cited

U.S. PATENT DOCUMENTS 5,245,347 A * 9/1993 Bonta ................... G01S 7/2813
                                                         342/149
5,924,212 A * 7/1999 Domanski .............. G01R 33/02
                                                         324/247

(Continued)

FOREIGN PATENT DOCUMENTS

| DE | 4328573 | 3/1995 |
|---|---|---|
| WO | WO 99/53635 | 10/1999 |

(Continued)

*Primary Examiner* — Christopher W Fulton
(74) *Attorney, Agent, or Firm* — Haynes and Boone, LLP

(57) ABSTRACT

Techniques are disclosed for systems and methods to provide orientation and/or position data from an orientation and/or position sensor (OPS) while it is rotating. A system includes a logic device configured to communicate with an OPS that is rotationally coupled to a mobile structure. The logic device is configured to receive orientation and/or position data from the OPS while the OPS is rotating relative to the mobile structure and determine rotationally corrected orientation and/or position data referenced to the mobile structure, a rotationally actuated sensor assembly mounted to the mobile structure, and/or an absolute coordinate frame.

18 Claims, 11 Drawing Sheets

Related U.S. Application Data application No. PCT/US2014/038286, filed on May 15, 2014.

(60) Provisional application No. 62/212,955, filed on Sep. 1, 2015, provisional application No. 62/099,090, filed on Dec. 31, 2014, provisional application No. 62/044,911, filed on Sep. 2, 2014, provisional application No. 61/823,906, filed on May 15, 2013, provisional application No. 61/823,903, filed on May 15, 2013.

(51) Int. Cl.
*G01S 13/93* (2006.01)
*G01S 15/02* (2006.01)

(56) References Cited

U.S. PATENT DOCUMENTS

| | | | | |
|---|---|---|---|---|
| 6,415,223 B1* | 7/2002 | Lin | ............ | G01C 21/20 340/988 |
| 7,587,277 B1* | 9/2009 | Wells | ............ | G01C 21/165 701/510 |
| 8,275,544 B1* | 9/2012 | Wells | ............ | G01C 21/165 342/146 |
| 2004/0123474 A1* | 7/2004 | Manfred | ............ | G01C 17/38 33/352 |
| 2005/0099887 A1* | 5/2005 | Zimmerman | ....... | G01S 7/52003 367/12 |
| 2009/0254294 A1* | 10/2009 | Dutta | ............ | G01C 17/28 702/92 |
| 2009/0292495 A1* | 11/2009 | Navarro, Jr. | ............ | G01C 19/42 702/92 |
| 2011/0077889 A1* | 3/2011 | Vogt | ............ | G01C 17/38 702/93 |
| 2011/0241656 A1* | 10/2011 | Piemonte | ............ | G01C 17/38 324/207.11 |
| 2012/0136573 A1* | 5/2012 | Janardhanan | ........ | G01C 21/165 701/512 |
| 2015/0285660 A1* | 10/2015 | Linton | ............ | G01C 21/18 73/1.77 |

FOREIGN PATENT DOCUMENTS

| | | | |
|---|---|---|---|
| WO | WO 2012/044964 | 4/2012 | |
| WO | WO-2016036767 A2 * | 3/2016 | ............ G01S 15/025 |

* cited by examiner

ROTATING ATTITUDE HEADING REFERENCE SYSTEMS AND METHODS

CROSS-REFERENCE TO RELATED APPLICATIONS

This application is a continuation of International Patent Application No. PCT/US2015/047991 filed Sep. 1, 2015 and entitled "ROTATING ATTITUDE HEADING REFERENCE SYSTEMS AND METHODS," which is incorporated herein by reference in its entirety.

International Patent Application No. PCT/US2015/047991 filed Sep. 1, 2015 claims priority to and the benefit of U.S. Provisional Patent Application No. 62/212,955 filed Sep. 1, 2015 and entitled "ROTATING ATTITUDE HEADING REFERENCE SYSTEMS AND METHODS," which is hereby incorporated by reference in its entirety.

International Patent Application No. PCT/US2015/047991 filed Sep. 1, 2015 claims priority to and the benefit of U.S. Provisional Patent Application No. 62/099,090 filed Dec. 31, 2014 and entitled "ROTATING ATTITUDE HEADING REFERENCE SYSTEMS AND METHODS," which is hereby incorporated by reference in its entirety.

International Patent Application No. PCT/US2015/047991 filed Sep. 1, 2015 claims priority to and the benefit of U.S. Provisional Patent Application No. 62/044,911 filed Sep. 2, 2014 and entitled "REMOTE SENSING WITH INTEGRATED ORIENTATION AND POSITION SENSORS SYSTEMS AND METHODS," which is hereby incorporated by reference in its entirety.

This application is also a continuation in part of U.S. patent application Ser. No. 14/941,497 filed Nov. 13, 2015 and entitled "AUTOMATIC COMPASS CALIBRATION SYSTEMS AND METHODS," which is hereby incorporated by reference in its entirety.

U.S. patent application Ser. No. 14/941,497 filed Nov. 13, 2015 is a continuation of International Patent Application No. PCT/US2014/038286 filed May 15, 2014 and entitled "AUTOMATIC COMPASS CALIBRATION SYSTEMS AND METHODS," which is incorporated herein by reference in its entirety.

International Patent Application No. PCT/US2014/038286 filed May 15, 2014 claims priority to and the benefit of U.S. Provisional Patent Application No. 61/823,903 filed May 15, 2013 and entitled "AUTOMATIC COMPASS CALIBRATION SYSTEMS AND METHODS" and U.S. Provisional Patent Application No. 61/823,906 filed May 15, 2013 and entitled "AUTOMATIC COMPASS CALIBRATION SYSTEMS AND METHODS," which are all incorporated herein by reference in their entirety.

TECHNICAL FIELD

One or more embodiments of the invention relate generally to attitude sensing systems and more particularly, for example, to systems and methods for providing absolute attitudes and headings using a rotating sensor.

BACKGROUND

Remote sensing systems, such as radar, sonar, lidar, and/or other ranging sensory systems, are often used to assist in navigation by producing data and/or imagery of the environment surrounding a mobile structure, such as imagery representing above-surface and/or subsurface features critical to navigation of a watercraft over a body of water. Conventional remote sensing systems often include a display configured to provide traditionally recognizable remote sensing imagery to a user.

Remote sensing imagery, and particularly imagery comprising aggregations of remote sensor returns received over time, is typically subject to a variety of measurement errors that reduce the reliability of the imagery, particularly as the range to the area being sensed increases. Further, motion of the remote sensing system increases the number, type, and magnitude of the measurement errors, and such errors increase the risk of a user misinterpreting the imagery (e.g., relative ranges, depths, sizes, and other critical distances reflected in the imagery). At the same time, consumer market pressures and convenience dictate easier to use systems that are inexpensive and that produce high quality resulting imagery. Thus, there is a need for an improved methodology to provide highly accurate remote sensing systems, particularly in the context of providing easily calibrated systems configured to produce reliable remote sensing data and/or imagery important to general operation of a mobile structure.

SUMMARY

Techniques are disclosed for systems and methods to provide orientation and/or position data from an orientation and/or position sensor (OPS) while it is rotating. A system includes a logic device configured to communicate with an OPS that is rotationally coupled to a mobile structure. The logic device is configured to receive orientation and/or position data from the OPS while the OPS is rotating relative to the mobile structure and determine rotationally corrected orientation and/or position data referenced to the mobile structure, a rotationally actuated sensor assembly mounted to the mobile structure, and/or an absolute coordinate frame. A remote sensing imagery system may include radar assemblies, sonar assemblies, other remote sensing assemblies, and logic devices in communication with the various assemblies. Each remote sensing assembly may be adapted to be mounted to a mobile structure and/or placed in a body of water, and each remote sensing imagery system may include an OPS. The logic devices may be configured to receive sensor data and generate imagery based on the sensor data. Subsequent user input and/or the sensor data may be used to adjust a steering actuator, a propulsion system thrust, and/or other operational systems of the mobile structure.

In various embodiments, a system may include one or more orientation sensors, position sensors, gyroscopes, accelerometers, and/or additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a logic device configured to communicate with an OPS rotationally coupled to a mobile structure, such as though a rotationally actuated remote sensing assembly. The logic device may be configured to receive orientation and/or position data from the OPS while the OPS is rotating relative to the mobile structure; and determine rotationally corrected orientation and/or position data referenced to the mobile structure, a rotationally actuated sensor assembly mounted to the mobile structure, and/or an absolute coordinate frame, wherein the rotationally corrected orientation and/or position data is based, at least in part, on the received orientation and/or position data.

In another embodiment, a method may include receiving orientation and/or position data from an orientation and/or position sensor (OPS) rotationally coupled to a mobile structure while the OPS is rotating relative to the mobile structure; and determining rotationally corrected orientation and/or position data referenced to the mobile structure, a rotationally actuated sensor assembly mounted to the mobile structure, and/or an absolute coordinate frame, wherein the rotationally corrected orientation and/or position data is based, at least in part, on the received orientation and/or position data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
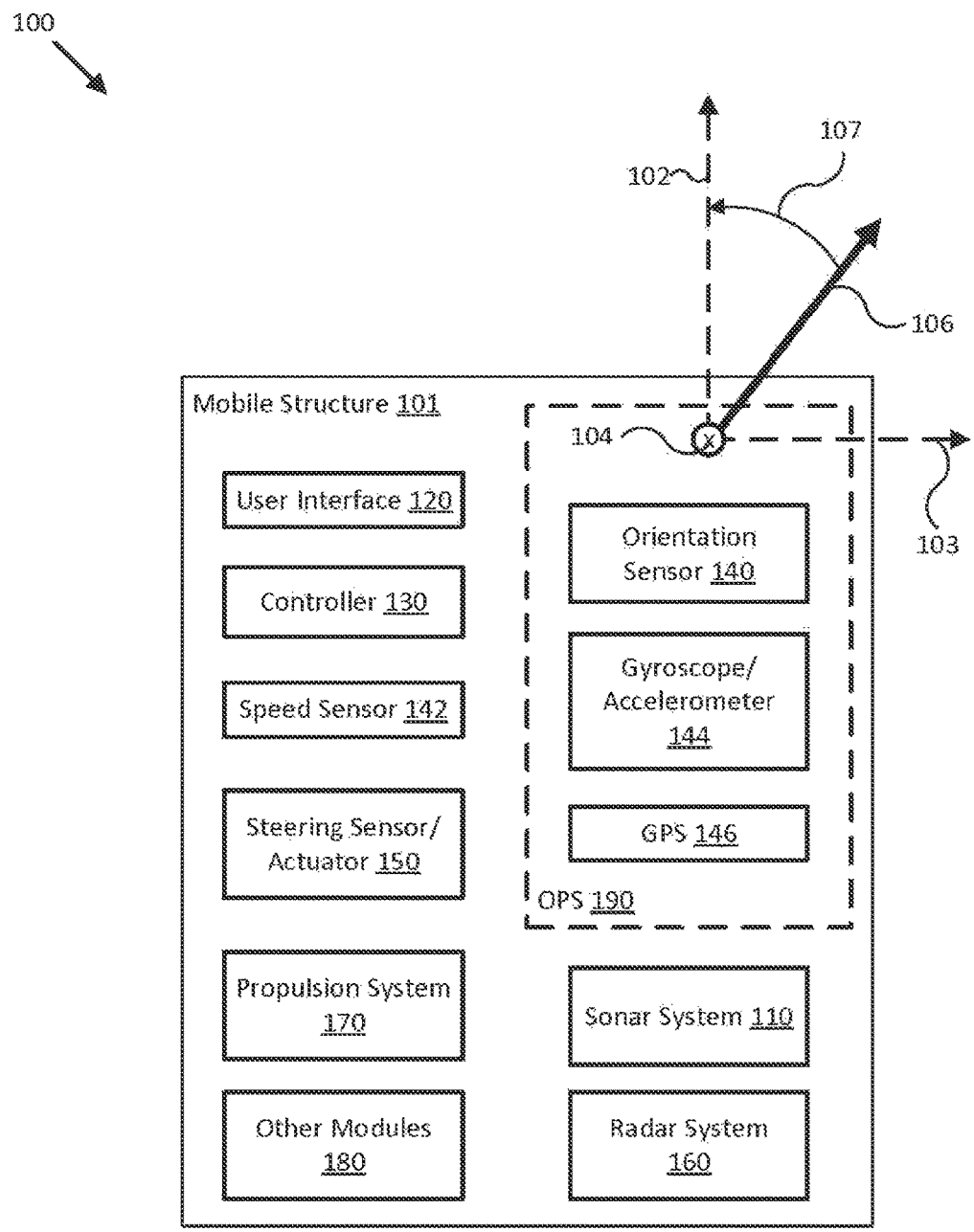
FIG. 1A illustrates a block diagram of a remote sensing imagery system in accordance with an embodiment of the disclosure.

In accordance with various embodiments of the present disclosure, remote sensing imagery may be provided by a remote sensing system (e.g., a radar and/or sonar system) including one or more remote sensing assemblies, orientation sensors, gyroscopes, accelerometers, position sensors, and/or speed sensors providing measurements of an orientation, a position, an acceleration, and/or a speed of the remote sensing assemblies and/or a coupled mobile structure. For example, the various sensors may be mounted to or within the mobile structure (e.g., a watercraft, aircraft, motor vehicle, and/or other mobile structure), or may be integrated with the remote sensing assemblies, as described herein. Embodiments of the present disclosure produce remote sensing imagery that is easily calibrated and relatively inexpensive to implement, thereby providing remote sensing imagery that is highly accurate and more accessible to consumers than conventional systems and/or methods.

In conventional remote sensing systems, such as radar and sonar systems mounted to watercraft, velocity, position and orientation sensors are used to associate the watercraft's orientation, position and velocity to the external world sensed by the remote sensing system's transducer or antenna, and this association process propagates relatively large measurement errors throughout the system. For example, with respect to radar imagery, at least some portion of the orientation of the radar sensing element (e.g., the radar antenna) relative to the outside world can be determined by combining the yaw of the antenna (e.g., relative to the longitudinal axis of its coupled watercraft) and the heading of the watercraft as measured by the watercraft's compass (e.g. referenced to True or Magnetic North). However, the watercraft's heading is conventionally fed to the radar assembly over a network connection, and this transit incorporates measurement error in the than of latency. Any offset angle between the longitudinal axis of the radar assembly and the longitudinal axis of the watercraft is typically calibrated through sea-trials/directed maneuvers of the watercraft performed periodically only after the radar system is installed, and the offset angle calibration's accuracy is typically limited both in angular resolution and time.

In typical operation, radar returns obtained as the antenna rotates are tagged with the watercraft's heading and the antenna's orientation relative to the watercraft, and then the combined data is sent to a display or used to calculate tracking information (e.g., automatic radar plotting aid (ARPA) or mini ARPA (MARPA) tracking information). When the watercraft makes a turn or is deflected from a steady heading, the variable delay/latency in receiving the heading data from the compass over the network introduces errors in the calculation of the orientation of the radar image. The resulting ground referenced radar image is not steady, different portions of the radar image are incorrectly aligned when overlaid on a chart, and the course and speed of targets are incorrectly calculated.

For example, the rate of turn of the watercraft could easily become 20 degrees per second. Heading data is typically sent at 10 Hz (e.g., in conventional consumer systems), and so the estimation of the antenna orientation typically includes an error range of +/−1 degrees based on the timing portion of the measurement error alone (e.g., assuming there are no additional delays elsewhere in the network between the sensor and radar or within either). The offset angle calibration may be performed by measuring the apparent heading to a known target represented in the radar imagery and adjusting the offset angle until the apparent heading agrees with the targets known heading. However, for an antenna beamwidth of 5 degrees, this offset angle calibration technique includes a measurement error corresponding to approximately twice the beamwidth, which, when exacerbated by the timing error, brings the total measurement error to at least +/−6 degrees. As a result, a target at a distance of 10 nautical miles can appear displaced laterally by more than +/−1 nautical mile in the radar image relative to its true position.

With respect to sonar imagery, sonar systems can be configured to sense distance and orientation (in 1D, 2D, or 3D) of objects in the water relative to the sonar transducer. In conventional systems, the sonar transducer's motion through the water typically distorts the sonar image as the vessel heaves, rolls, pitches and yaws. Data from an orientation sensor placed remote from the sonar transducer suffers variable latency before it can be applied to the sonar data, and the magnitude of the variable latency in conventional systems typically does not permit the orientation data to be used (e.g., in a feedback loop) to maintain the absolute orientation of the transducer and reduce or eliminate the distortion through actuated motion of the sonar transducer.

Including orientation and/or position sensors (OPSs) within a remote sensing assembly reduces or eliminates timing errors due to non-synchronicity of the data from the sensing element and data sent from an external sensor over a network. The reduced error allows a helmsman to rely on distances and relative bearings to a coastline or structure on a seafloor or fish in the water, for example, and the increased accuracy facilitates a number of operational modes, such as closing or avoiding a target, overlaying remote imagery on a chart, tracking other vessels, relating targets to automatic identification system (AIS) information, and/or other operational modes.

In addition, an embedded OPS can be implemented at reduced cost as the various types of orientation and position sensors constituting the OPS can share power supplies, processing devices, interfaces, and the enclosure/housing of the associated remote sensing system. Installing separate and external orientation/position sensors/housings requires separate cables and additional installation time, and calibration sea-trials often need to be performed periodically to align the external sensors with the remote sensing system.

In various embodiments, the timing resolution between remote sensor returns and corresponding sensor return orientation and/or position data from an integrated OPS (e.g., the maximum period of time between receiving a radar return and receiving a corresponding orientation of a radar antenna, for example) can be less than 100 milliseconds, less than 10 milliseconds, less than 1 millisecond, and/or less than 100 microseconds, depending on the power requirements for the remote sensing imagery system implementation and/or the cost limitations for the OPS. For example, if a particular sensor in an OPS can only be polled at 10 Hz, due to a recovery time delay for example, the OPS may be implemented with two or more of the same sensor where the polling frequencies are staggered so as to double or otherwise multiplicatively increase the availability of the data, but with the added cost and increased power draw of the additional sensors.

In embodiments where the OPSs are attached to the remote sensing elements so as to move with the antenna or transducer, additional advantages accrue from the direct measurement of the antenna or transducer orientation/position and the synchronicity of the measurements made by the sensing element and the OPS. For example, with respect to radar, if the OPS is positioned behind the radar antenna and rotates with the antenna, then its exposure to electromagnetic radiation from the antenna can be significantly reduced. Mounting the OPS on moving parts of the radar allows the orientation of the sensing element/antenna to be determined directly rather than through inference from indirect internal and external data. As noted above, conventionally, the antenna's absolute orientation is calculated by adding the watercraft's heading to the relative yaw of the antenna, and a correction is then then made for any offset angle between the fixed housing orientation and the longitudinal axis of the watercraft. Mounting the OPS on the rotating antenna platform obviates any need for the continuous calculation and the periodic offset angle calibration. The radar returns may be captured with a direct measurement of the antenna's orientation and position relative the external world as sensed by the OPS.

The orientation and/or position data supplied by the OPS can also be used to measure and/or maintain a stable or desired rotation rate (e.g., angular frequency) of the antenna relative to the outside world. The inertia of the antenna can be used to assist in stabilizing the antenna's absolute angular frequency. Conventionally, only the angular frequency of the antenna relative to the housing is stable, and sudden changes in the yaw of the watercraft can result in distorted radar imagery due to random changes in the angular frequency, in addition to subjecting the antenna drive to sharp torsional accelerations or decelerations to the antenna platform.

With respect to sonar, by accurately and reliably determining the orientation of the transducer as the vessel heaves, rolls, pitches and yaws, corrections can be made to the flight time and angle of recent data relative to prior data to allow composite imagery to be created which is undistorted by motion of the watercraft and/or sonar assembly. The speed of sound in water is slow enough that a watercraft's orientation can change substantially during the flight time of the sonar pulse. Mounting the OPS such that it maintains the same orientation as the sonar transducer allows the orientation/position of the sonar transducer to be measured directly rather than inferred from internal and external data, and the reduced or eliminated latency allows the orientation/position data to be used to physically maintain the orientation/track of the transducer through use of an actuator, as described herein.

Specific embodiments of the present disclosure offer corresponding specific enhancements over conventional remote sensing imagery systems. For example, in one embodiment, a remote sensing imagery system according to the present disclosure may include a remote sensing system (e.g., radar, sonar, lidar, and/or other remote sensing systems) and an OPS disposed within a housing for the remote sensing system and configured to provide orientation data but not position data. Such a system is compact, self-contained, relatively inexpensive to manufacture and install, and can be configured to generate north-up radar image data without latency induced measurement errors. Moreover, no offset angle calibration is necessary in embodiments where only north-up imagery is produced, and so no periodic sea-trial calibrations are required.

In embodiments where course-up imagery is selected to be generated, the remote sensing imagery system may be implemented with a sensing element angle sensor coupled to the remote sensing assembly and configured to measure an angle between an orientation of the antenna and a longitudinal axis of the radar assembly housing and/or the watercraft. In such embodiments, the remote sensing imagery system may be configured to determine the offset angle using antenna angle measurements, radar image data, and/or one or more known absolute headings represented in the radar image data (e.g., provided in a chart and/or through alignment of the watercraft with a visible object, for example). Such offset angle may be used to determine the course-up display reference for the radar image data substantially aligned with a longitudinal axis of the mobile structure.

In another embodiment, a remote sensing imagery system according to the present disclosure may include a remote sensing system with an OPS configured to provide orientation data but not position data, where the OPS is disposed within the housing for the remote sensing system so as to be fixed relative to a sensing element. For example, where the sensing element is actuated, the OPS could be coupled to the same actuator. In embodiments where the remote sensing system is a radar system, the OPS could be coupled to the rotating radar antenna platform. Orientation data from a rotating OPS could be used to calibrate a magnetometer of the OP S against magnetic interference, such as internal magnetic interference generated by elements of the system.

Additionally, the orientation data from a rotating OPS could be used to provide substantially continuous calibration for gyroscope, accelerometer, and/or magnetometer gain and/or offset due to the rotation providing a known "test" motion for calibration against gravity and/or Magnetic North, for example. Furthermore, calibration of alignment of the various coordinate frames for each sensor relative to the antenna rotational axis can be achieved using the orientation data and rotating motion of the OPS. In embodiments where the mobile structure is a watercraft, routine recalibration can be performed at power on at a dockside, for example, when there is little or no motion of the watercraft. One or more Helmholtz coils may be added to the assembly to provide selective and/or substantially total cancellation of the Earth's magnetic field, thus facilitating full alignment of the three axes of each sensor. Calibration of alignment, offset and/or gain of the yaw axis of a gyroscope of the OPS may be achieved using two or more known rates of rotation of the antenna, such as 24 and 48 RPM. All sensors of the OPS can be arranged such that they remain behind the radar antenna and/or associated shielding and are substantially protected from electromagnetic radiation interference related to radar beams and/or returns.

In some embodiments, a remote sensing imagery system according to the present disclosure may include a remote sensing system with an OPS configured to provide orientation data and position data (e.g., through use of GPS, GLONASS, Galileo, COMPASS, IRNSS, and/or other global navigation satellite systems (GNSSs)). In such embodiments, the remote sensing imagery system may be configured to determine the track, course over ground (COG), and/or speed over ground (SOG) of the remote sensing system and/or the coupled mobile structure from the position data provided by the OPS. Corresponding headings (e.g., referenced to True North, for example) may be determined from the track, COG, and/or SOG, and the effects of wind and tide can be estimated and displayed or removed from the heading. Set (e.g., due to tide) and leeway (e.g., due to wind) errors may not need to be compensated for because the data provided by the OPS can be referenced to an absolute coordinate frame.

In another embodiment, a remote sensing imagery system according to the present disclosure may include a remote sensing system with an OPS configured to provide orientation and position data, and where the OPS is disposed within the housing for the remote sensing system so as to be fixed relative to a sensing element. In such embodiments, the remote sensing imagery system may be configured to use a rotating OPS as a GNSS compass including a single position sensor, whereas conventional implementations of a GNSS compass can require a plurality of position sensors.

In a further embodiment, a remote sensing imagery system according to the present disclosure may include a remote sensing system with an OPS configured to provide orientation data and position data, but where the OPS is implemented without a magnetometer and/or other device capable of sensing Magnetic North. In such embodiments, the remote sensing imagery system may be configured to use position data provided by the OPS to correct and/or calibrate other sensor data provided by the OPS. The lack of a magnetometer significantly reduces the complexity of the OPS and of the processing necessary to derive headings and/or calibrations from the magnetometer data, and additionally reduces the susceptibility of the OPS to electromagnetic interferences. However, if the mobile structure to which the embodiment is couple is motionless, no heading can be determined. In some embodiments, the remote sensing imagery system can be implemented with a sensing element angle sensor and the remote sensing imagery system can be configured to display remote sensor data according to a course-up display reference substantially aligned with a longitudinal axis of the mobile structure.

In various embodiments, data fusion may be used to calibrate the various sensors of an OPS by taking the best data produced from each sensor and using the collection of best data to cross-compensate/calibrate for errors in relatively poor data from the sensors. For example, long term drift in gyroscope data (e.g., offset error) can be detected and/or compensated for using data from a magnetometer. And, short term errors in the determination of the heading and/or the horizontal plane can be detected and/or compensated for using the gyroscope data. More generally, some sensors in an OPS may be used to determine and/or compensate for errors in other sensors of the OPS, as indicated by their relative accuracy/stability in the short or long teem. This approach may be used with data from all combinations of sensors described herein, including the radar returns and/or sonar returns. Table 1 provides relative characteristics of various sensors in the context of resolving target bearings.

TABLE 1

| Sensor Data Advantages and Disadvantages | Radar or Sonar | Accelerometers or gyroscopes | Magnetic compass | GNSS |
|---|---|---|---|---|
| Type of information | Relative | Inertial | Absolute | Absolute |
| Timeframe | Immediate | Immediate | Depends on internal latency | Track needs historical data |
| Short term stability relative to inertial frame | N/A | Excellent | Poor | Poor unless very high update rate |
| Longer term stability relative to inertial frame | N/A | Very poor | Good | Excellent |
| Source of target bearing errors | Beamwidth, offset angle, beam shape | Axis alignment errors, gain and offset errors which drift with time and | Axis alignment errors, difference between True and Magnetic North at a location, magnetic interference, dip angle of Earth's magnetic field, errors in | Determination of track requires historical data which is inherently not current |

TABLE 1-continued

| Sensor Data Advantages and Disadvantages | Radar or Sonar | Accelerometers or gyroscopes | Magnetic compass | GNSS |
|---|---|---|---|---|
| | | temperature | determining horizontal plane due to centripetal accelerations from turning | |

FIG. 1A illustrates a block diagram of remote sensing imagery system 100 in accordance with an embodiment of the disclosure. In various embodiments, system 100 may be adapted to measure an orientation, a position, an acceleration, and/or a speed of sonar system 110, radar system 160, user interface 120, and/or mobile structure 101 using any of the various sensors of OPS 190 and/or system 101. System 100 may then use these measurements to generate accurate image data from sonar data provided by sonar system 110 and/or radar data provided by radar system 160 according to a desired operation of system 100 and/or mobile structure 101. In some embodiments, system 100 may display resulting imagery to a user through user interface 120, and/or use the sonar data, radar data, orientation and/or sensor data, and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide orientation and/or position data for a particular type of mobile structure 101, such as a drone, a watercraft, an aircraft, a robot, a vehicle, and/or other types of mobile structures, including any platform designed to move through or under the water, through the air, and/or on a terrestrial surface. In one embodiment, system 100 may include one or more of a sonar system 110, a radar system 160, a user interface 120, a controller 130, an OPS 190 (e.g., including an orientation sensor 140, a gyroscope/accelerometer 144, and/or a global positioning satellite system (GPS) 146), a speed sensor 142, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, True North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or other module of sonar system 110, OPS 190, orientation sensor 140, and/or user interface 120, for example) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements (e.g., remote sensing system arrangements) that can be used to detect objects within a water column and/or a floor of a body of water.

More generally, sonar system 110 may be configured to emit one, multiple, or a series of acoustic beams (e.g., remote sensor beams), receive corresponding acoustic returns (e.g., remote sensor returns), and convert the acoustic returns into sonar data and/or imagery (e.g., remote sensor image data), such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide relatively accurate and/or distortion free underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with its own dedicated OPS 190, which may include various orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on a chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, OPS 190 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

Radar system 160 may be implemented as one or more electrically and/or mechanically coupled controllers, transmitters, receivers, transceivers, signal processing logic devices, various electrical components, antenna elements of various shapes and sizes, multichannel antennas/antenna modules, radar assemblies, assembly brackets, mast brackets, and/or various actuators adapted to adjust orientations of any of the components of radar system 160, as described herein. For example, in various embodiments, radar system 160 may be implemented according to various radar system arrangements (e.g., remote sensing system arrangements) that can be used to detect features of and objects on or above a terrestrial surface or a surface of a body of water.

More generally, radar system 160 may be configured to emit one, multiple, or a series of radar beams (e.g., remote sensor beams), receive corresponding radar returns (e.g., remote sensor returns), and convert the radar returns into radar data and/or imagery (e.g., remote sensor image data), such as one or more intensity plots and/or aggregation of intensity plots indicating a relative position, orientation, and/or other characteristics of structures, weather phenomena, waves, other mobile structures, surface boundaries, and/or other objects reflecting the radar beams back at radar system 160. Sonar system 110 may be configured to provide such data and/or imagery to user interface 120 for display to a user, for example, or to controller 130 for additional processing, as described herein. Moreover, such data may be used to generate one or more charts corresponding to AIS data, ARPA data, MARPA data, and or one or more other target tracking and/or identification protocols.

In some embodiments, radar system 160 may be implemented using a compact design, where multiple radar antennas, sensors, and/or associated processing devices are located within a single radar assembly housing that is configured to interface with the rest of system 100 through a single cable providing both power and communications to and from radar system 160. In some embodiments, radar system 160 may include orientation and/or position sensors (e.g., OPS 190) configured to help provide two or three dimensional waypoints, increase radar data and/or imagery quality, and/or provide highly accurate radar image data, as described herein.

For example, fisherman desire highly detailed and accurate information and/or imagery of local and remote structures and other watercraft. Conventional radar systems can be expensive and bulky and typically cannot be used to provide relatively accurate and/or distortion free radar image data, as described herein. Embodiments of radar system 160 include low cost single, dual, and/or multichannel (e.g., synthetic aperture) radar systems that can be configured to produce detailed two and three dimensional radar data and/or imagery. In some embodiments, radar system 160 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, radar system 160 may be implemented with its own dedicated OPS 190, which may include various orientation and/or position sensors (e.g., similar to orientation sensor 140, gyroscope/accelerometer 144, and/or GPS 146) that may be incorporated within the radar assembly housing to provide three dimensional orientations and/or positions of the radar assembly and/or antenna(s) for use when processing or post processing radar data for display. The sensor information can be used to correct for movement of the radar assembly between beam emissions to provide improved alignment of corresponding radar returns/samples, for example, and/or to generate imagery based on the measured orientations and/or positions of the radar assembly/antenna. In other embodiments, an external orientation and/or position sensor can be used alone or in combination with an integrated sensor or sensors.

In embodiments where radar system 160 is implemented with a position sensor, radar system 160 may be configured to provide a variety of radar data and/or imagery enhancements. For example, radar system 160 may be configured to provide accurate positioning of radar data and/or user-defined waypoints remote from mobile system 101. Similarly, radar system 160 may be configured to provide accurate two and/or three dimensional aggregation and/or display of a series of radar data; without either orientation data or position data to help determine a track or heading, a radar system typically assumes a straight track, which can cause image artifacts and/or other inaccuracies in corresponding radar data and/or imagery. Additionally, when implemented with a position sensor, radar system 160 may be configured to generate accurate and detailed intensity plots of objects on a surface of a body of water without access to a magnetometer.

In embodiments where radar system 160 is implemented with an orientation and/or position sensor, radar system 160 may be configured to store such location/position information along with other sensor information (radar returns, temperature measurements, text descriptions, altitude, mobile structure speed, and/or other sensor and/or control information) available to system 100. In some embodiments, controller 130 may be configured to generate a look up table so that a user can select desired configurations of radar system 160 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of radar system 160, and controller 130 may be configured to control an actuator and/or otherwise implement the configuration for radar system 160 (e.g., to set a particular orientation or rotation rate). In still another embodiment, controller 130 may be configured to receive orientation measurements for mobile structure 101. In such embodiment, controller 130 may be configured to control the actuators associated with the radar assembly to maintain its orientation relative to, for example, the mobile structure and/or the water surface, and thus improve the displayed sonar images (e.g., by ensuring consistently oriented radar beams and/or proper registration of a series of radar returns). In various embodiments, controller 130 may be configured to control steering sensor/actuator 150 and/or propulsion system 170 to adjust a position and/or orientation of mobile structure 101 to help ensure proper registration of a series of radar returns, radar data, and/or radar imagery.

Although FIG. 1A shows various sensors and/or other components of system 100 separate from radar system 160, in other embodiments, any one or combination of sensors and components of system 100 may be integrated with a radar assembly, an actuator, a transducer module, and/or other components of radar system 160. For example, OPS 190 may be integrated with an antenna platform of sonar system 110 and be configured to provide measurements of an absolute and/or relative orientation (e.g., a roll, pitch, and/or yaw) of the antenna to controller 130 and/or user interface 120, both of which may also be integrated with radar system 160.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of sonar system 110, radar system 160, and/or mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110, or an antenna or radar assembly of radar system 160) overlaid on a geographical map, which may include one or more graphs indicating a corresponding time series of actuator control signals, sensor information, and/or other sensor and/or control signals, including sonar and/or radar image data.

In some embodiments, user interface 120 may be adapted to accept user input including a user-defined target heading, route (e.g., track for radar system 160), and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude/absolute angular frequency for an actuated device (e.g., sonar system 110, radar system 160) coupled to mobile structure 101, for example, and to generate control signals for adjusting an orientation or rotation of the actuated device according to the target attitude/angular frequency. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, radar system 160, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, radar system 160, mobile structure 101, and/or system 100.

OPS 190 may be implemented as an integrated selection of orientation and/or position sensors (e.g., orientation sensor 140, accelerometer/gyroscope 144, GPS 146) that is configured to provide orientation and/or position data in relation to one or more elements of system 100. For example, embodiments of OPS 190 may be integrated with mobile structure 101, sonar system 110, and/or radar system 160 and be configured to provide orientation and/or position data corresponding to a center of mass of mobile structure 101, a sonar transducer of sonar system 110, and/or a radar antenna of radar system 160. Such measurements may be referenced to an absolute coordinate frame, for example, or may be referenced to a coordinate frame of OPS 190 and/or any one of the individual sensors integrated with OPS 190. More generally, OPS 190 provides a single, relatively compact integrated device that can be replicated throughout various elements of system 100, which in some embodiments may include a single/simplified interface for data and/or power. In various embodiments, the coordinate frames for one or more of the orientation and/or position sensors integrated into OPS 190 may be referenced to each other (e.g., to a single coordinate frame for OPS 190), such as at time of manufacture, to reduce or eliminate a need to determine coordinate frame transformations to combine data from multiple sensors of OPS 190 during operation of system 100.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example. In various embodiments, orientation sensor 140 may be implemented and/or operated according to any of the systems and methods described in International Application PCT/US14/38286 filed May 15, 2014 and entitled "AUTOMATIC COMPASS CALIBRATION SYSTEMS AND METHODS", which is hereby incorporated by reference in its entirety.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 (e.g., or an element of mobile structure 101, such as sonar system 110 radar system 160, and/or user interface 120) based on wireless signals received from space-born and/or terrestrial sources, for example, and capable of providing such measurements as sensor signals that may be communicated to various devices of system 100. More generally, GPS 146 may be implemented to any one or combination of a number of different GNSSs. In some embodiments, GPS 146 may be used to determine a velocity, speed, COG, SOG, track, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example.

In other embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130). Other modules 180 may include a sensing element angle sensor, for example, which may be physically coupled to a radar assembly housing of radar system 160 and be configured to measure an angle between an orientation of an antenna/sensing element and a longitudinal axis of the housing and/or mobile structure 101. Other modules 180 may also include a rotating antenna platform and/or corresponding platform actuator for radar system 160. In some embodiments, other modules 180 may include one or more Helmholtz coils integrated with OPS 190, for example, and be configured to selectively cancel out one or more components of the Earth's magnetic field.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Similarly, the same or similar components may be used to create a radar pulse (e.g., a transmission control signal and/or a digital shaping control signal), convert the radar pulse to an excitation signal (e.g., a shaped or unshaped transmission signal) and transmit it to a radar antenna to produce a radar beam, receive a radar return (e.g., an electromagnetic wave received by the radar antenna and/or corresponding electrical signals from the radar antenna), convert the radar return to radar return data, and/or store sensor information, configuration data, and/or other data corresponding to operation of a radar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110, radar system 160, and/or other sensors of system 100 to/from a coordinate frame of orientation sensor 140 and/or mobile structure 101, for example. Furthermore, such parameters may be used to determine and/or calculate one or more adjustments to an orientation of sonar system 110 and/or radar system 160 that would be necessary to physically align a coordinate frame of sonar system 110 and/or radar system 160 with a coordinate frame of orientation sensor 140 and/or mobile structure 101, for example, or an absolute coordinate frame. Adjustments determined from such parameters may be used to selectively power adjustment servos/actuators (e.g., of sonar system 110, radar system 160, and/or other sensors or elements of system 100), for example, or may be communicated to a user through user interface 120, as described herein.

Figure 1B:
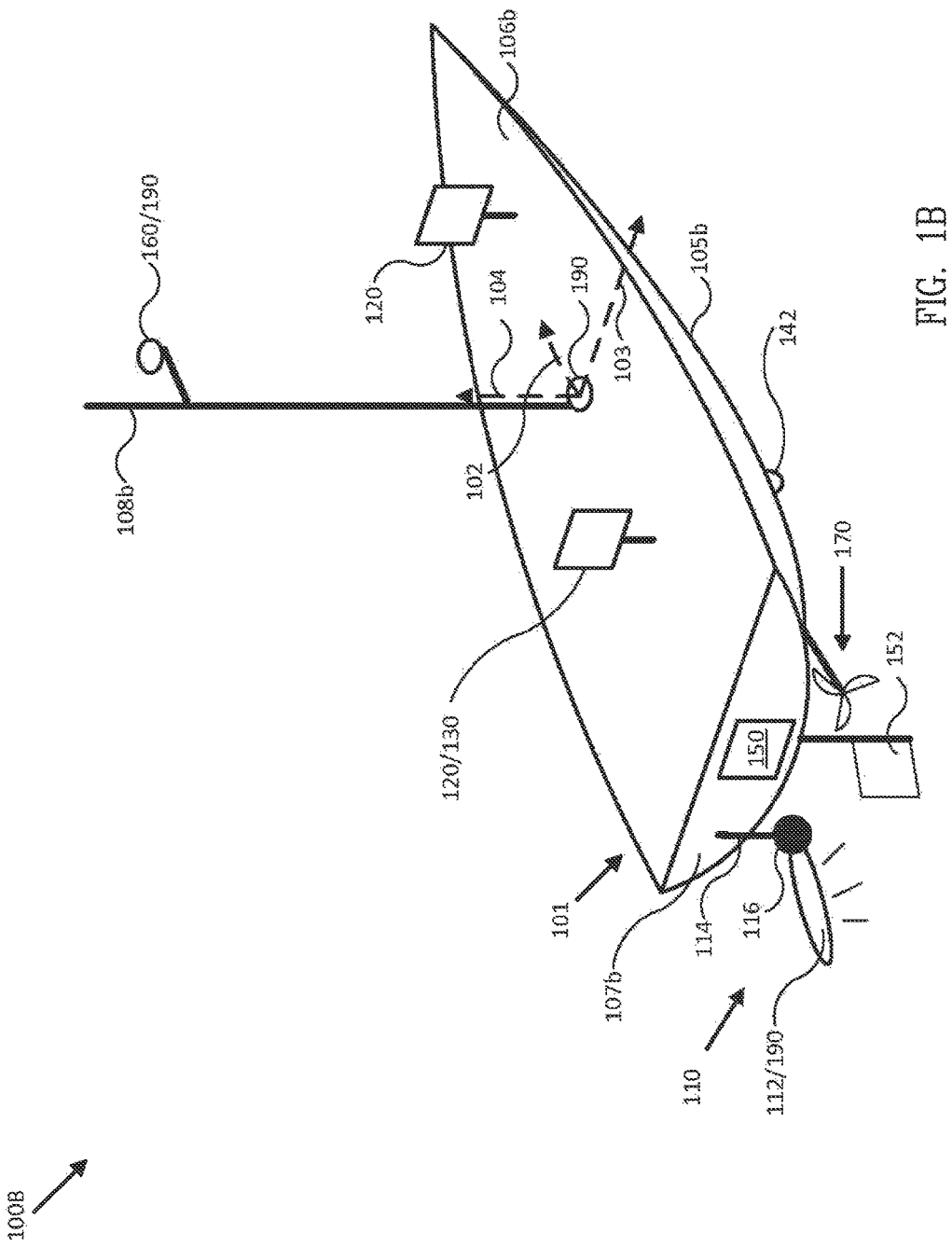
FIG. 1B illustrates a diagram of a remote sensing imagery system in accordance with an embodiment of the disclosure.

FIG. 1B illustrates a diagram of system 100B in accordance with an embodiment of the disclosure. In the embodiment shown in FIG. 1B, system 100B may be implemented to provide sonar and/or radar data and/or imagery for use with operation of mobile structure 101, similar to system 100 of FIG. 1A. For example, system 100B may include sonar system/OPS 110/190, radar system/OPS 160/190, integrated user interface/controller 120/130, secondary user interface 120, steering sensor/actuator 150, sensor cluster/OPS 190 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, radar system/OPS 160/190 coupled to mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes OPS 190 integrated with transducer assembly 112, which are coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

Also shown in FIG. 1B is radar system 160, which includes integrated OPS 190 and a radar antenna platform and actuator configured to rotate the radar antenna about a vertical axis substantially aligned with vertical axis 104 of mobile structure 101. In some embodiments, user interface/controller 120/130 may be configured to receive radar returns from a radar assembly of radar system/OPS 160/190, and corresponding orientation and/or position data from radar system/OPS 160/190 (e.g., corresponding to an orientation and/or position of an antenna of radar system 160 when the radar returns are received), and then generate radar image data based, at least in part, on the radar returns and the corresponding orientation and/or position data.

More generally, both sonar system 110 and radar system 160 are types of remote sensing systems, each with remote sensing assemblies (e.g., sonar assemblies, radar assemblies) including housings adapted to be mounted to mobile structure 101, each with OPS disposed within their respective housings and adapted to measure an orientation and/or position of an associated sensing element (e.g., sonar transducer, radar antenna), and each having access to or integrated with a logic device (e.g., controller 130) configured to receive remote sensor returns from the corresponding remote sensing assembly and sensor return orientation and/or position data from the corresponding OPS and generate remote sensor image data based, at least in part, on the remote sensor returns and the sensor return orientation and/or position data. Once the remote sensor image data is received, user interface/controller 120/130 may be configured to render the remote sensor image data on a display of any one of user interface 120, for example. In some embodiments, multiple sets of remote sensor image data may be displayed on the same user interface using one or more geo-referenced, target references, and/or source references overlays.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100E and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
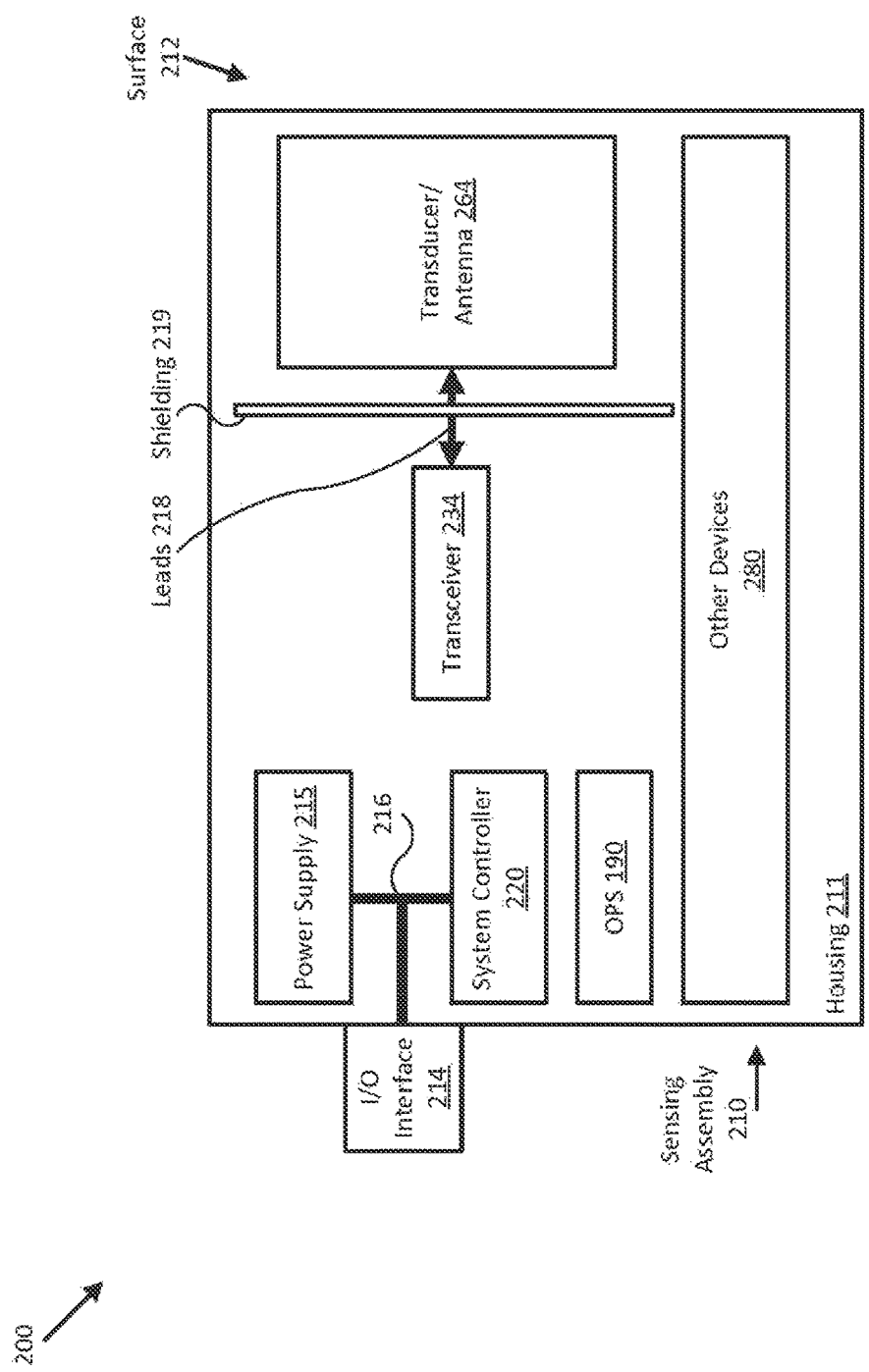
FIG. 2 illustrates a diagram of a remote sensing imagery system in accordance with an embodiment of the disclosure.

FIG. 2 illustrates a diagram of a remote sensing imagery system 200 in accordance with an embodiment of the disclosure. In the embodiment shown in FIG. 2, system 200 includes a remote sensing assembly 210 that can be coupled to a user interface (e.g., user interface 120 of FIG. 1A) and/or a power source through a single I/O cable 214. As shown, remote sensing assembly 210 may include one or more system controllers 220, sensing elements (e.g., transducer/antenna 264), OPS 190, and/or other devices facilitating operation of system 200 all disposed within a common housing 211. In other embodiments, one or more of the devices shown in FIG. 2 may be integrated with a remote user interface and communicate with remaining devices within remote sensing assembly 210 through one or more data and/or power cables similar to I/O cable 214.

Controller 220 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of remote sensing assembly 210 and/or system 200, for example, similar to controller 130. In typical embodiments, controller 220 may be tasked with overseeing general operation of remote sensing assembly 210, generating remote sensor image data from remote sensor returns and sensor return orientation and/or position data, correlating sensor data with remote sensor data/imagery, communicating operational parameters and/or sensor information with other devices through I/O cable 214, and/or other operations of system 200. Controller 220 may in some embodiments be implemented with relatively high resolution timing circuitry capable of generating digital transmission and/or sampling control signals for operating transmitters, receivers, transceivers, signal conditioners, and/or other devices of remote sensing assembly 210, for example, and other time critical operations of system 200, such as per-sample digital beamforming and/or interferometry operations applied to remote sensor returns from sensing element 264, as described herein. In some embodiments, controller 220 may be implemented in a distributed manner across a number of individual controllers.

Transceiver 234 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from controller 220 and to generate transmission signals to excite a transmission channel/element of remote sensing assembly 210 (e.g., sensing element 264, which in some embodiments can be used to transmit remote sensor beams and receive sensor returns) to produce one or more remote sensor beams. In some embodiments, various transmission operations of transceiver 234 (e.g., amplification, frequency dependent filtering, transmit signal frequency, duration, shape, and/or timing/triggering, and/or other signal attributes), may be controlled (e.g., through use of various control signals) by controller 220, as described herein.

Transceiver 243 may also be implemented with one or more analog to digital converters (ADCs), filters, phase adjusters, signal conditioning elements, amplifiers, timing circuitry, logic devices, and/or other digital and/or analog electronics configured to accept analog remote sensor returns from a corresponding receive channel/sensing element of remote sensing assembly 210 (e.g., sensing element 264), convert the analog remote sensor returns into digital remote sensor returns, and provide the digital sensor returns to controller 220. In some embodiments, various receive operations of transceiver 234 (e.g., amplification, frequency dependent filtering, basebanding, sample resolution, duration, and/or timing/triggering, and/or other ADC/signal attributes) may be controlled by controller 220.

For example, controller 220 may be configured to use transceiver 234 to convert a remote sensor return into a digital remote sensor return comprising one or more digital baseband transmissions that are then provided to controller 220. In some embodiments, transceiver 234 may be configured to low-pass or otherwise filter, amplify, decimate, and/or otherwise process the analog and/or digital remote sensor returns (e.g., using analog and/or digital signal processing) prior to providing the digital remote sensor returns to controller 220. In other embodiments, transceiver 234 may be configured to provide substantially unprocessed (e.g., raw) analog and/or digital remote sensor returns to controller 220 for further signal processing, as described herein. In further embodiments, transceiver 234 may be implemented as one or more separate transmitters and receivers.

In the embodiment shown in FIG. 2, sensing element 264 is implemented as a single transmission/receive channel that may be configured to transmit remote sensor beams and receive remote sensor returns through emission surface 212 of housing 211. In some embodiments, remote sending assembly 210 may be implemented with multiple transmission and/or receive channels (e.g., a multichannel sonar transducer, or a multichannel/synthetic aperture radar antenna). In general, remote sending assembly 210 may be implemented with one, two, or many separate elements configured to produce one or more remote sensor beams, and one, two, or many separate sensing elements configured to receive remote sensor returns. The effective volumetric shapes of the remote sensor beams and remote sensor returns may be determined by the shapes and arrangements of their corresponding transducer elements. In multichannel embodiments, the various channels may be arranged to facilitate multichannel processing, such as beamforming, interferometry, inter-beam interpolation, and/or other types of multichannel processing used to produce remote sensor data and/or imagery.

In FIG. 2, each of sensing element 264 is coupled to its electronics over leads 218 and through shielding 219. In various embodiments, leads 218 and/or shielding 219 may be implemented as one or more shielded transmission lines configured to convey analog and/or digital signals between the various elements while shielding transceiver 234 and sensing element 264 from electromagnetic interference from each other, other elements of remote sensing assembly 210 (e.g., OPS 190), and/or external sources. In some embodiments, leads 218 and shielding 219 may be integrated together to form a transmission system. For example, shielding 219 may be configured to provide a ground plane/return for signals conveyed by leads 218.

As shown, remote sensing assembly 210 may be implemented with OPS 190, which may be configured to measure a relative and/or absolute orientation and/or position of remote sensing assembly 210 and/or sensing element 264 and provide such measurements to controller 220. In some embodiments, controller 220 may be configured to combine remote sensor data and/or imagery according to such measurements and/or measurements of an orientation and/or position of a coupled mobile structure to produce combined remote sensor data and/or imagery, such as multiple co-registered remote sensor images, for example, and/or three dimensional remote sensor imagery. In other embodiments, controller 220 may be configured to use orientation and/or position measurements of remote sensing assembly 210 and/or a coupled mobile structure to control one or more actuators (e.g., other devices 280) to adjust a position and/or orientation of remote sensing assembly 210 and/or sensing element 264 and emit remote sensor beams towards a particular position and/or orientation, for example, or otherwise control motion of remote sensing assembly 210 and/or sensing element 264.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of remote sensing assembly 210 and/or sensing element 264. In some embodiments, other devices 280 may include a visible spectrum camera, an infrared camera, and/or other environmental sensors providing measurements and/or other sensor signals that can be displayed to a user and/or used by other devices of remote sensing assembly 210 (e.g., controller 220) to provide operational control of remote sensing assembly 210. In some embodiments, other devices 280 may include one or more actuators adapted to adjust an orientation (e.g., roll, pitch, and/or yaw) and/or a position (longitudinal, lateral, and/or vertical) of remote sensing assembly 210 and/or sensing element 264 relative to a coupled mobile structure, in response to one or more control signals (e.g., provided by controller 220). In other embodiments, other devices 280 may include one or more brackets, such as a transom bracket or a mast bracket, adapted to couple housing 211 to a mobile structure.

Other devices 280 may also include a sensing element angle sensor, for example, which may be physically coupled to housing 211 of remote sensing assembly 210 and be configured to measure an angle between an orientation of sensing element 264 and a longitudinal axis of housing 211 and/or mobile structure 101. Other devices 280 may also include a rotating platform and/or corresponding platform actuator for sensing element 264 and/or remote sensing assembly 210. In some embodiments, other devices 280 may include one or more Helmholtz coils integrated with OPS 190, for example, and be configured to selectively cancel out one or more components of the Earth's magnetic field, as described herein.

In various embodiments, remote sensing assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between remote sensing assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of remote sensing assembly 210.

Figure 3:
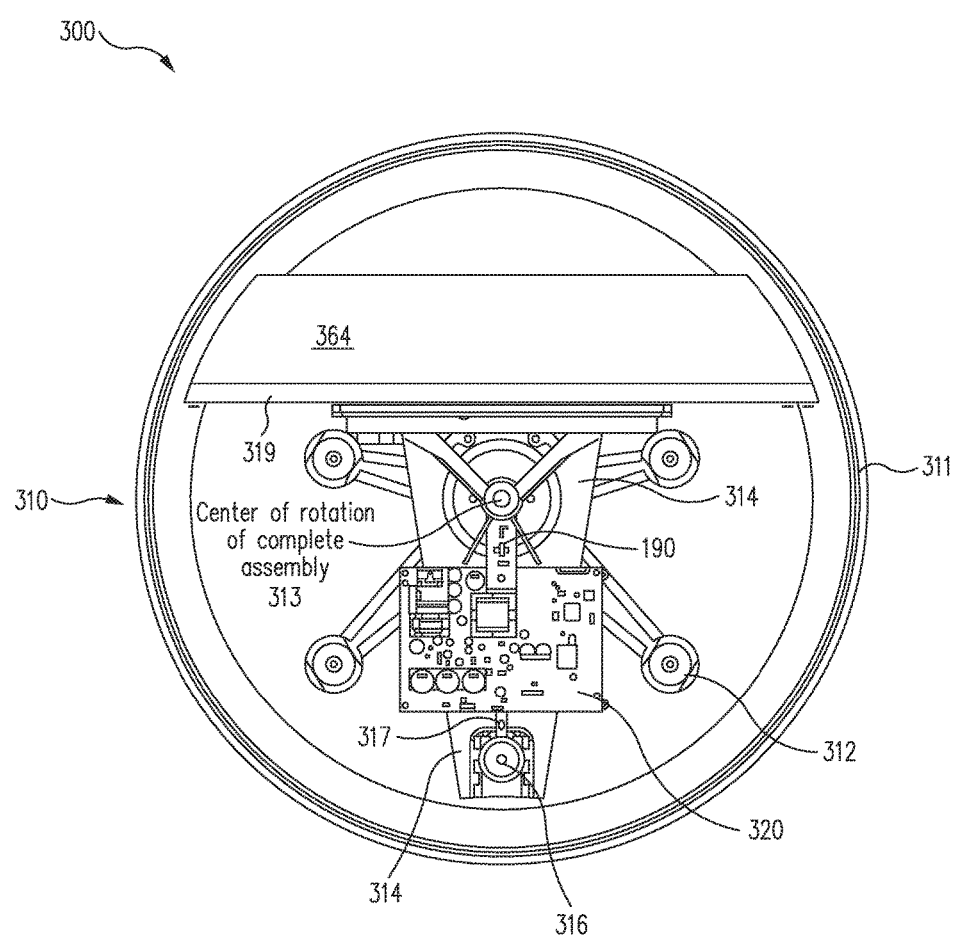
FIG. 3 illustrates a diagram of a remote sensing imagery system in accordance with an embodiment of the disclosure.

FIG. 3 illustrates a diagram of a remote sensing imagery system 300 in accordance with an embodiment of the disclosure. In the embodiment shown in FIG. 3, remote sensing imagery system 300 is implemented as a radar system including a radar assembly 310, housing 311, and radar antenna 364 shielded from system controller 320 and OPS 190 by shielding 319, which correspond to and/or may be implemented similarly to remote sensing assembly 210, housing 211, sensing element 264, controller 220, OPS 190, and shielding 319 of FIG. 2, respectively. Also shown are antenna platform 314 and platform actuator 316 configured to rotate antenna 364, shielding 319, controller 320, and OPS 190 about axis 313, and sensing element (e.g., radar antenna) angle sensor 317 configured to measure an angle between an orientation of antenna 364 and a longitudinal axis of housing 311 (e.g., a vertical line passing perpendicularly through the antenna surface in the orientation shown in FIG. 3). In various embodiments, OPS 190 may be configured to determine an orientation and/or position of remote sensing imagery system 300 while antenna platform 314 is rotating within housing 311. Implementations for corresponding methods are provided in FIGS. 5 through 10 of the present disclosure.

In some embodiments, radar antenna angle sensor 317 may be configured to monitor a position of platform actuator 316, for example, and derive the measured angle from the monitored position. In other embodiments, radar antenna angle sensor 317 may be configured to detect passage over one or more indexed posts 312 corresponding to a known orientation of antenna 364 relative to a longitudinal axis of housing 311. Controller 320 may be configured to receive a measured angle corresponding to a particular known relative orientation when radar antenna angle sensor 317 passes over the appropriate indexed post 312.

Figure 4:
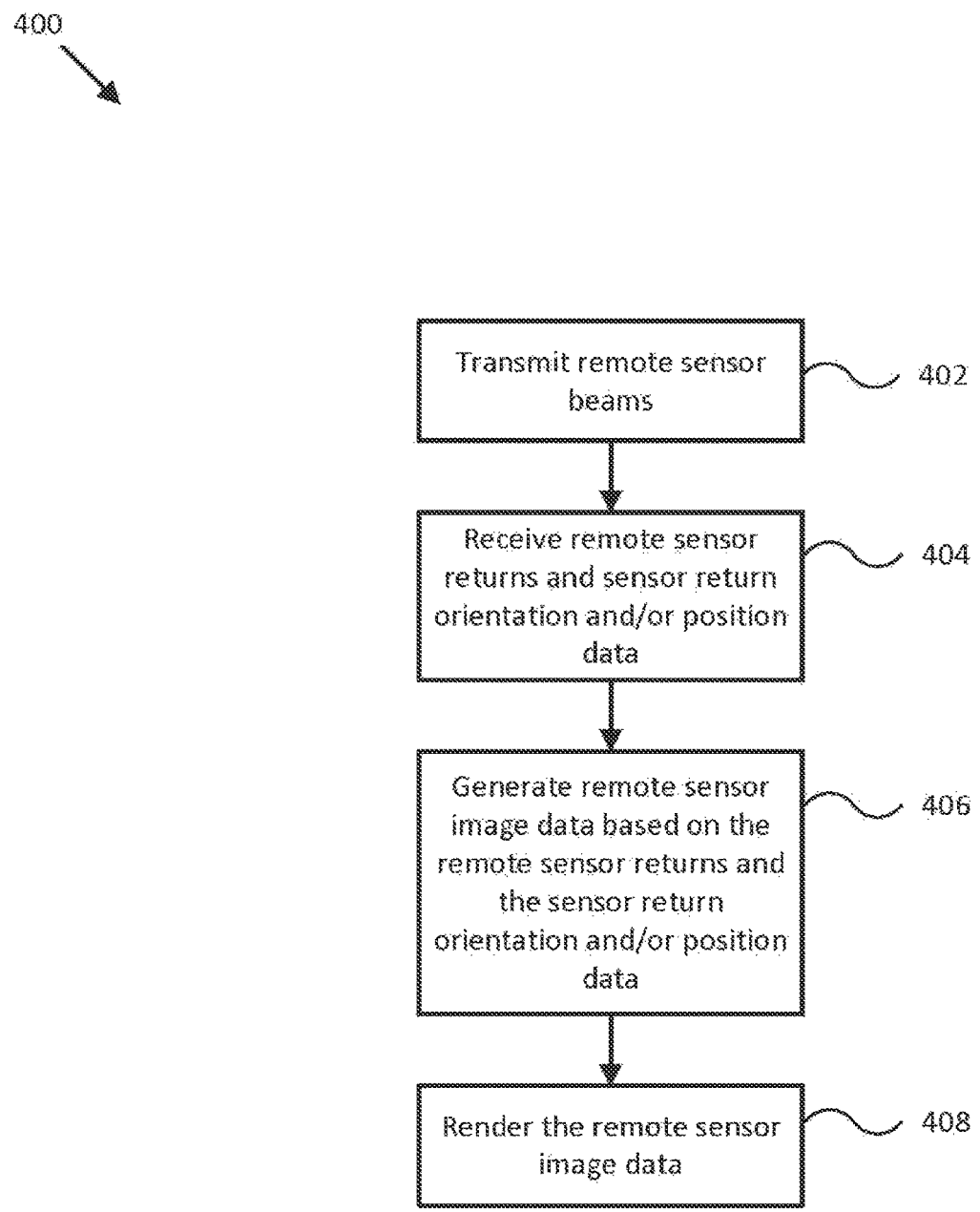
FIG. 4 illustrates a flow diagram of various operations to operate a remote sensing imagery system in accordance with an embodiment of the disclosure.

FIG. 4 illustrates a flow diagram of process 400 to provide remote sensing data and/or imagery for mobile structure 101 in accordance with embodiments of the disclosure. In some embodiments, the operations of FIG. 4 may be implemented as software instructions executed by one or more logic devices associated with corresponding electronic devices, sensors, and/or structures depicted in FIGS. 1A through 3. More generally, the operations of FIG. 4 may be implemented with any combination of software instructions and/or electronic hardware (e.g., inductors, capacitors, amplifiers, actuators, or other analog and/or digital components).

It should be appreciated that any step, sub-step, sub-process, or block of process 400 may be performed in an order or arrangement different from the embodiments illustrated by FIG. 4. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 400 is described with reference to systems described in FIGS. 1A-3, process 400 may be performed by other systems different from those systems and including a different selection of electronic devices, sensors, assemblies, mobile structures, and/or mobile structure attributes.

Process 400 represents a method for providing remote sensing data and/or imagery using systems 100, 100B, 200, and/or 300 in accordance with embodiments of the disclosure. At the initiation of process 400, various system parameters may be populated by prior execution of a process similar to process 400, for example, or may be initialized to zero and/or one or more values corresponding to typical, stored, and/or learned values derived from past operation of process 400, as described herein.

In block 402, a logic device transmits remote sensor beams. For example, controller 220 of system 200 may be configured to transmit sonar (acoustic) beams, radar beams, and/or other remote sensor beams from surface 212 using transceiver 234 and sensing element 264. In some embodiments, controller 220 may be configured to receive sensor transmission orientation and/or position data from OPS 190 corresponding to the transmitted beams, for example, for further processing. In other embodiments, controller 220 may be configured to receive a desired orientation, position, and/or angular frequency (e.g., an absolute angular frequency) for motion of sensing element 264, as user input from user interface 120 for example, and be configured to control a corresponding actuator (e.g., actuator 316) to adjust the orientation and/or position of sensing element 264 prior to transmitting the remote sensor beams. In such embodiments, controller 320 may be configured to receive adjusted sensor transmission orientation and/or position data from OPS 190 prior to proceeding to block 404.

In block 404, a logic device receives remote sensor returns and sensor return orientation and/or position data. For example, controller 220 may be configured to receive remote sensor returns from sensing element 264 and/or transceiver 234 (e.g., remote sensing assembly 210) and, substantially at the same time, receive sensor return orientation and/or position data from OPS 190. For example, the timing resolution between the remote sensor returns and the corresponding sensor return orientation and/or position data is less than approximately 100 milliseconds, less than 1 millisecond, or less than 100 microseconds, as described herein.

In some embodiments, controller 220 may be configured to receive a desired orientation, position, and/or angular frequency from user interface 120 and be configured to control a corresponding actuator (e.g., actuator 316) to adjust the orientation and/or position of sensing element 264 prior to or while receiving the remote sensor returns, then receiving, with the remote sensor returns, adjusted sensor return orientation and/or position data from OPS 190. In embodiments where remote sensor assembly 210 comprises a sonar assembly and sensing element 264 comprises a sonar transducer, the actuator may be configured to adjust an orientation and/or position of the sonar transducer and/or OPS 190 (e.g., if OPS is fixed relative to the sonar transducer) while the remote sensor returns are received by controller 220.

In embodiments where remote sensor assembly 210 comprises a radar assembly (e.g., radar assembly 310), actuator 316 may be configured to rotate radar antenna 364 and/or OPS 190 about axis 313 of radar assembly 310 while the remote sensor returns are received by controller 320. In one such embodiment, controller 320 may be configured to control actuator 316 to rotate radar antenna 364 and/or OPS 190 according to the desired angular frequency relative to an absolute coordinate frame using absolute sensor return orientation and/or position data provided, at least in part, by OPS 190 (e.g., such as when OPS 190 includes a magnetometer capable of measuring Magnetic North and/or a GNSS compass). In various embodiments, OPS 190 may include one or more of accelerometer/gyroscope 144, GPS 146, and/or orientation sensor 140 (e.g., a magnetometer, a float level, a compass, and/or other orientation sensing device adapted to measure the orientation and/or position of sensing element 264 during motion of sensing element 264, remote sensor assembly 210, and/or mobile structure 101.

In various embodiments, controller 220 may be configured to calibrate and/or align the various sensors of OPS 190 by receiving the remote sensor returns and the corresponding sensor return orientation and/or position data from OPS 190 during motion of remote sensing assembly 210, sensing element 264, and/or mobile structure 101, and calibrating and/or aligning one or more coordinate frames of the OPS with respect to each other, with respect to an absolute coordinate frame, and/or with respect to a coordinate frame of the mobile structure, using remote sensor returns and/or the sensor return orientation and/or position data, as described herein. For example, sensors with relatively good long term stability may be used to remove sensor drift in data from sensors with relatively poor long term stability, and sensors with relatively good short term stability maybe used to remove short term errors or transients in data from sensors with relatively poor short term stability. Such calibration processes can occur substantially in parallel with other steps in process 400.

In block 406, a logic device generates remote sensor image data based on the remote sensor returns and the sensor return orientation and/or position data. For example, controller 220 may be configured to generate remote sensor image data based, at least in part, on the remote sensor returns and sensor return orientation and/or position data received from sensing element 264, transceiver 234, and OPS 190 in block 404. In embodiments where controller 220 is configured to control an actuator (e.g., actuator 316) to adjust the orientation and/or position of sensing element 264 (e.g., in blocks 402 and/or 404) prior to or during transmission of remote sensor beams and/or remote sensor returns, controller 220 may also be configured to generate the remote sensor image data based, at least in part, on the remote sensor returns and the adjusted sensor return orientation and/or position data received in block 404, and/or on the adjust or unadjusted sensor transmission orientation and/or position data received in block 402.

As in block 404, in various embodiments, controller 220 may be configured to calibrate and/or align the various sensors of OPS 190 by receiving the remote sensor returns and the corresponding sensor return orientation and/or position data from OPS 190 during motion of remote sensing assembly 210, sensing element 264, and/or mobile structure 101. However, such calibration process can now take advantage of the additional remote sensor image data generated in this block 406. Therefore, in some embodiments, controller 220 may be configured to calibrate and/or align one or more coordinate frames of the OP S with respect to each other, with respect to an absolute coordinate frame, and/or with respect to a coordinate frame of the mobile structure, using remote sensor returns and/or the sensor return orientation and/or position data, as described herein. As noted in block 404, such calibration processes can occur substantially in parallel with various other steps in process 400 if the various data are available.

In block 408, a logic device renders the remote sensor image data. For example, controller 220 may be configured to render the remote sensor image data generated in block 406 using a display of user interface 120. In some embodiments, the rendered remote sensor image data may be referenced to an absolute coordinate frame (e.g., North-up) and/or a coordinate frame of the mobile structure (e.g., course-up). In various embodiments, controller 220 may be configured to receive sensing element angle measurements from a sensing element angle sensor (e.g., sensing element angle sensor 317), so as to measure and/or compensate for an offset angle for example.

In such embodiments, controller 220 may be configured to determine the absolute coordinate frame display reference and/or the coordinate frame of the mobile structure display reference (e.g., both of which can require determination of the offset angle) based, at least in part, on the sensing element angle measurements and/or GPS data provided by OPS 190. For example, in some embodiments, a time series of GPS data may be used to measure SOG, COG, and/or track for mobile structure 101, thereby providing an estimate of the orientation of mobile structure 101 relative to an absolute coordinate frame (e.g., using the GPS as a GNSS compass and assuming the track substantially coincides with a longitudinal axis of mobile structure 101).

In further embodiments, image data, position data, orientation data, and/or sonar data acquired and/or processed in blocks 402-408 may be used to control operation of mobile structure 101, such as by controlling steering sensor/actuator 150 and/or propulsion system 170 to steer mobile structure 101 according to a desired heading, track, one or more waypoints, a tide or wind effect, and/or other types of user and/or environmental input.

It is contemplated that any one or combination of methods to provide remote sensing imagery may be performed according to one or more operating contexts of a control loop, for example, such as a startup, learning, running, and/or other type operating context. For example, process 400 may proceed back to block 402 and proceed through process 400 again to produce updated augmented reality sonar imagery, as in a control loop.

As noted above, embodiments of the present disclosure provide an attitude and heading reference system (e.g., OPS 190) that can provide orientation and/or position data while mounted in a rotating platform attached to a moving rigid body. In particular, embodiments of the present disclosure support automatic calibration for the magnetic signature of the rotating platform, as well as that of the rigid body.

Classical attitude heading reference systems (AHRS) (e.g., OPS 190) are typically deployed on rigid bodies so that the mounting location represents the body as a whole. However, for applications composed of multiple elements, where it is desirable to mount the AHRS on an element which moves with respect to another, is may be necessary to compensate the AHRS for the relative motion. One example is radar, which contains a scanner rotating with respect to the ship; yet to build a self-contained north-up capable radar requires that the AHRS be mounted on the scanner platform. The AHRS is then subject to rapid rotational motion (typically 24 or 48 rpm) which dominates over the mobile structure roll/pitch/yaw motion. Since AHRS are generally designed to precisely pick up subtleties in ships motion, the dominance of the rotation makes it non trivial to subtract. Furthermore, the AHRS calibration mechanisms which correct for three dimensional soft and hard iron, and for sensor bias and rotation errors, need to continue to work while integrated with a rotating environment. An additional complication is that the rotating element may have a magnetic signature of its own, further complicating the challenge to obtain accurate magnetic heading, as well as roll and pitch.

Figure 5:
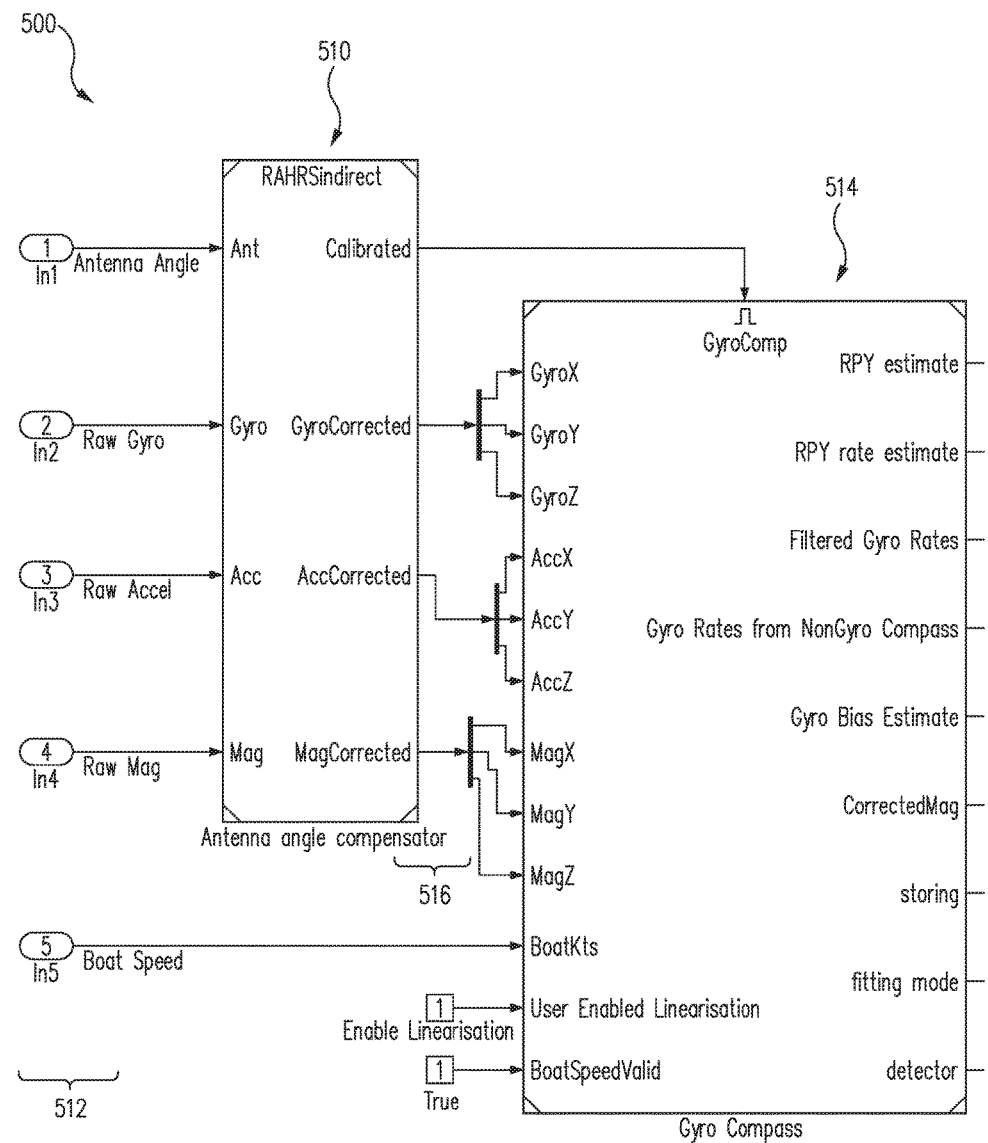
FIG. 5 illustrates a top level view of a rotating orientation and/or position sensor calibration system in accordance with an embodiment of the disclosure.

FIG. 5 illustrates a top level view of an OPS calibration system in accordance with an embodiment of the disclosure. In some embodiments, system 500 may be implemented as one or more control loops including a plurality of instructions running on one or more processors provided by, for example, controller 130 of system 100. For example, the operations of system 500 may be performed by controller 130 processing and/or operating on signals received from one or more of sensors 140-146, steering sensor/actuator 150, propulsion system 170, user interface 120, and/or other modules 180. In various embodiments, system 500 (e.g., and various subsystems, blocks, control loops, and/or other processes of FIGS. 5 through 10) may be implemented and/or operated according to any one or combination of the systems and methods described in International Patent Application No. PCT/US2014/038286 filed May 15, 2014 and entitled "AUTOMATIC COMPASS CALIBRATION SYSTEMS AND METHODS," and/or U.S. Provisional Patent Application No. 62/044,906 filed Sep. 2, 2014 and entitled "REMOTE SENSING WITH INTEGRATED ORIENTATION AND POSITION SENSORS SYSTEMS AND METHODS", which are hereby incorporated by reference in their entirety.

In accordance with an embodiment, each subsystem, block, control loop, and/or other process corresponding to system 500 and/or FIGS. 5 through 10 may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, block, or module of system 500 may be performed in an order or arrangement different from the embodiment illustrated by FIG. 5. For example, although the expanded view of system 500 in FIG. 6 includes block 624, in other embodiments, block 624 may not be present, for example, and/or may be replaced with one or more additional sensors providing corresponding measured data.

As shown in FIG. 5, system 500 includes antenna angle compensator block 510 and gyro compass block 514, where antenna angle compensator block 510 is configured to receive a plurality of raw input signals 512 and provide a plurality of output signals 516, which have been corrected or compensated for rotation, to gyro compass block 514 in response thereto. In various embodiments, input signals 512 may be provided and/or determined by appropriate components of FIGS. 1A and 1B (e.g., based on signals from local sensors of mobile structure 101, radar system 160, OPS 190, and/or other communications). In the embodiment shown in FIG. 5, antenna angle compensator block 510 is configured to receive a scalar antenna angle signal, and three vector signals including a raw gyroscope signal, a raw accelerometer signal, and a raw magnetometer signal, adding up to 9 axes of sensor signals (e.g., x, y, x accelerations and magnetic field strengths, and roll pitch and yaw from the gyroscope). Generally, antenna angle signal may be provided by a sensor similar to radar antenna angle sensor 317 in FIG. 3, and each of the remaining sensor signals may be provided to antenna angle compensator block 510 by, for example, OPS 190.

Gyro compass block 514 may be configured to receive the corrected gyroscope, accelerometer, and magnetometer signals and automatically calibrate the compass (e.g., and orientation sensor that generates the magnetometer signals) using various systems and methods described in International Patent Application No. PCT/US2014/038286 filed May 15, 2014 and entitled "AUTOMATIC COMPASS CALIBRATION SYSTEMS AND METHODS," which is incorporated herein by reference in its entirety. The outputs of gyro compass block 514 include a stabilized roll, pitch, and yaw estimate, corresponding roll, pitch, and yaw rate estimates, a calibrated compass output (e.g., calibrated against hard and/or soft iron signals), and/or various other debug or intermediary outputs.

Figure 6:
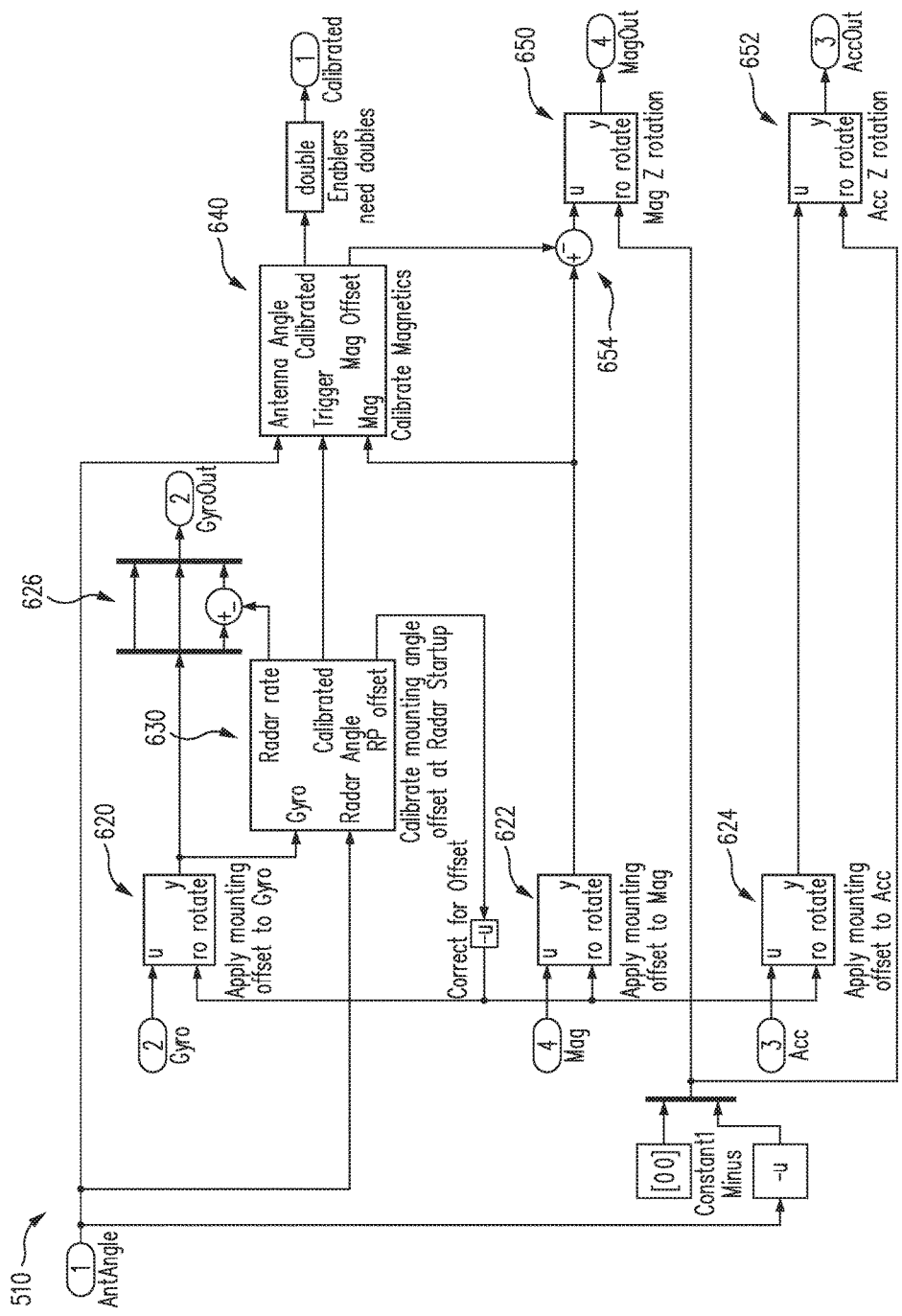
FIG. 6 illustrates a mid-level view of a rotating orientation and/or position sensor calibration system in accordance with an embodiment of the disclosure.

FIG. 6 illustrates a mid-level view of an OPS calibration system in accordance with an embodiment of the disclosure. As shown, antenna angle compensator block 510 unwinds the raw sensor outputs 512 provided to block 510 into the frame of reference of the non-rotating body (e.g., mobile structure 101). This is achieved for the gyroscope signals by subtracting the rotation rate from the Z output at block 626 and by rotating the accelerometer and magnetometer vectors by AntAngle (e.g., the measured angle associated with the raw sensor data being received from OPS 190) at respective blocks 650 and 652.

To achieve satisfactory accuracy, however, further compensation is needed, because a rotation rate of 24 or 48 rpm (e.g., typical of a radar system) is so high that slight axial misalignment between sensor axes and the rotational axis will produce rapid error build-up. So it is essential to estimate the axial Roll/Pitch misalignments & pre-compensate at blocks 620, 622 and 624, which are each configured to apply a coordinate frame transformation rotating the raw signals to align them with the rotation axis (e.g., for the noted antenna).

In various embodiments, the magnetic signature of the rotating component (e.g., the antenna and/or the motor) cannot be subtracted by the algorithm implemented in gyro compass block 514, which is looking for soft and hard iron contained within or local to the non-rotating body. In the embodiment shown in FIG. 6, only hard iron is being corrected, but the method can be extended to soft iron using the principles already noted in International Patent Application No. PCT/US2014/038286. As shown in FIG. 6, for hard iron, the two steps may include estimating the field strength in block 640 and then subtracting it from the aligned magnetometer data signals at block 654 before rotating the aligned magnetometer data signals according to the measured antenna angle at block 650.

Figure 7:
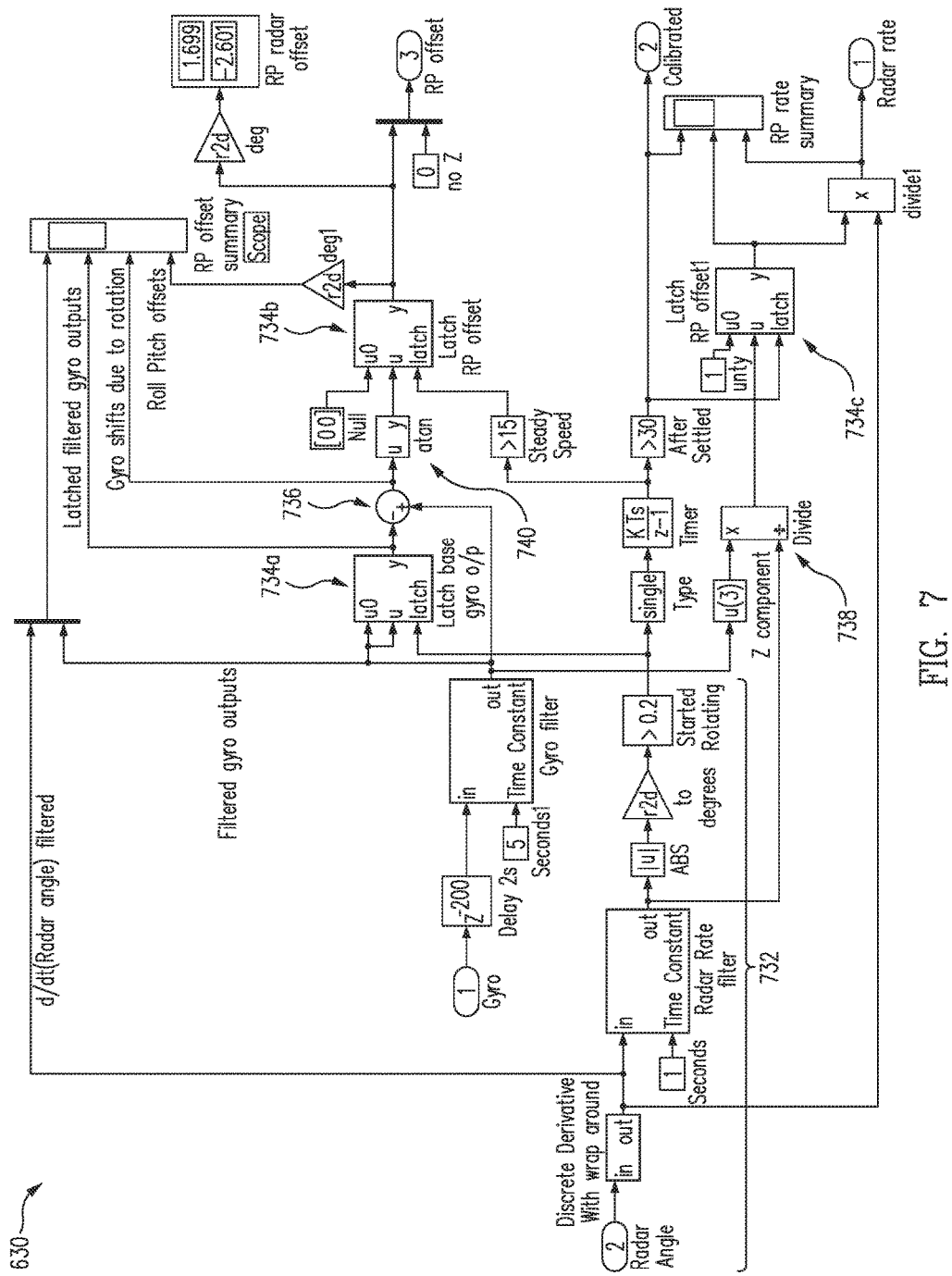
FIG. 7 illustrates a mid-level view of a rotating orientation and/or position sensor calibration system in accordance with an embodiment of the disclosure.

FIG. 7 illustrates a mid-level view of an OPS calibration system in accordance with an embodiment of the disclosure. As shown in FIG. 7, block 630 (e.g., also shown in FIG. 6) may be implemented with two inputs (radar angle and gyro 3 axes) and 3 outputs (roll pitch offsets, radar rate, and calibration complete flag). First portion 732 of block 630 may be configured to determine whether the antenna or sensor is rotating or not. During a non-rotating startup phase, the gyro outputs may be latched at block 734a so they can be compared with the rates just after startup at block 736. This delta is the effect of starting up and we can compute the angular pitch and roll errors from the delta seen in the x and y gyro outputs verses the delta seen in Z. Latch 734a (and latches 734b and 734c) may each be implemented generally as shown in FIG. 8.

Once the new gyro rates have had time to establish and settle, the new gyro rates can be latched and retained block 734b for use in the rest of a power cycle. The gyro Z axis measures the radar rotation rate, and this will typically not be unit calibrated against the shaft encoder rotation rate. The ratio between them is also captured and latched at block 734c during the startup phase, so that the radar rate can be used subsequently, calibrated to the gyro scale factor. Note that the above steps assume a certain degree of stability during the startup phase (e.g., moored dockside).

Figure 8:
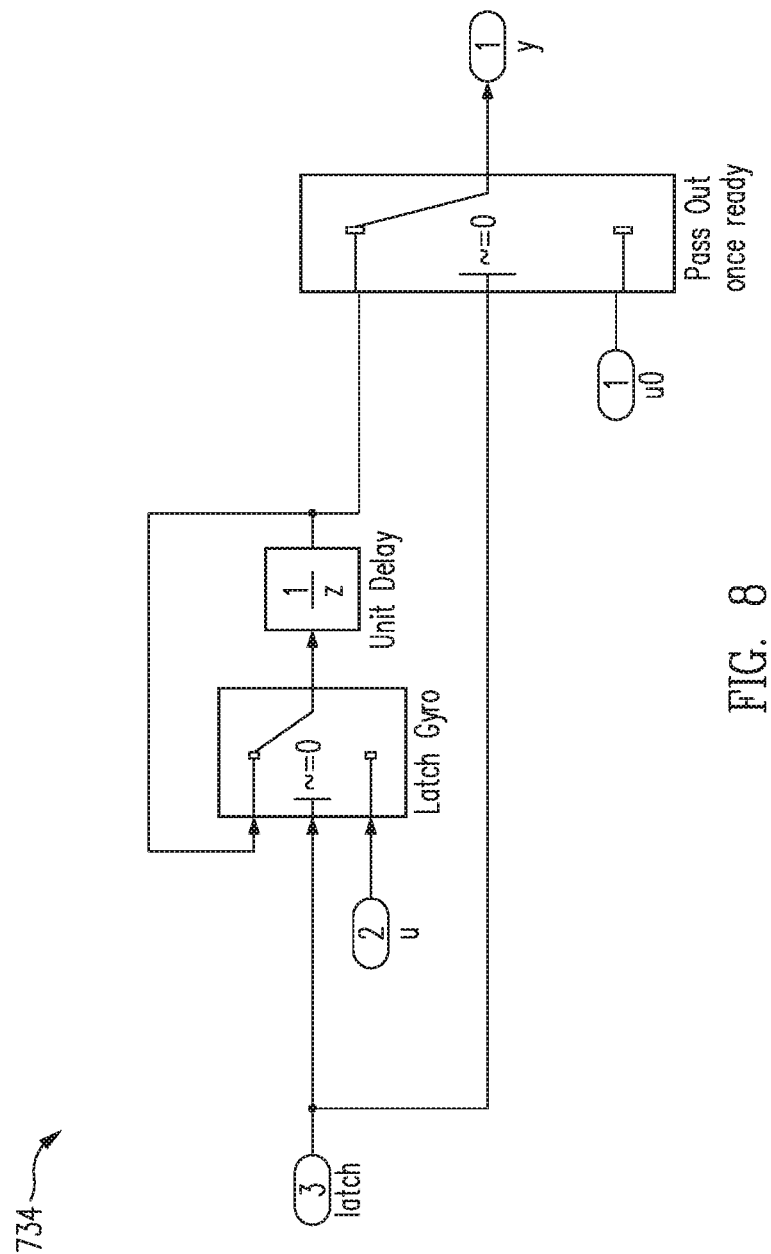
FIG. 8 illustrates a bottom-level view of a rotating orientation and/or position sensor calibration system in accordance with an embodiment of the disclosure.
Figure 9:
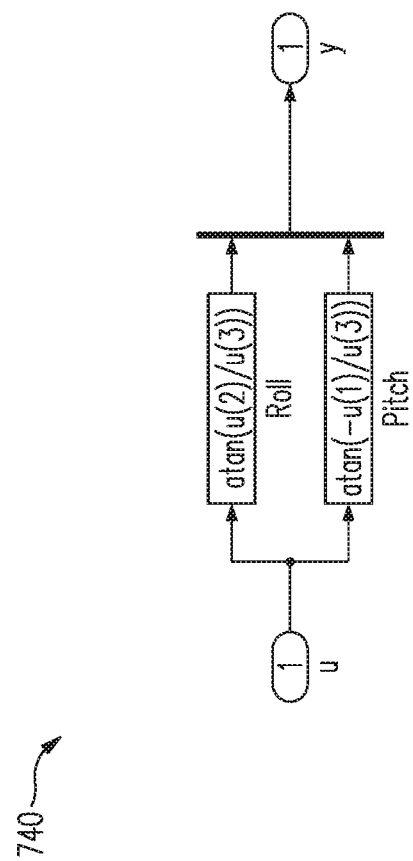
FIG. 9 illustrates a bottom-level view of a rotating orientation and/or position sensor calibration system in accordance with an embodiment of the disclosure.
Figure 10:
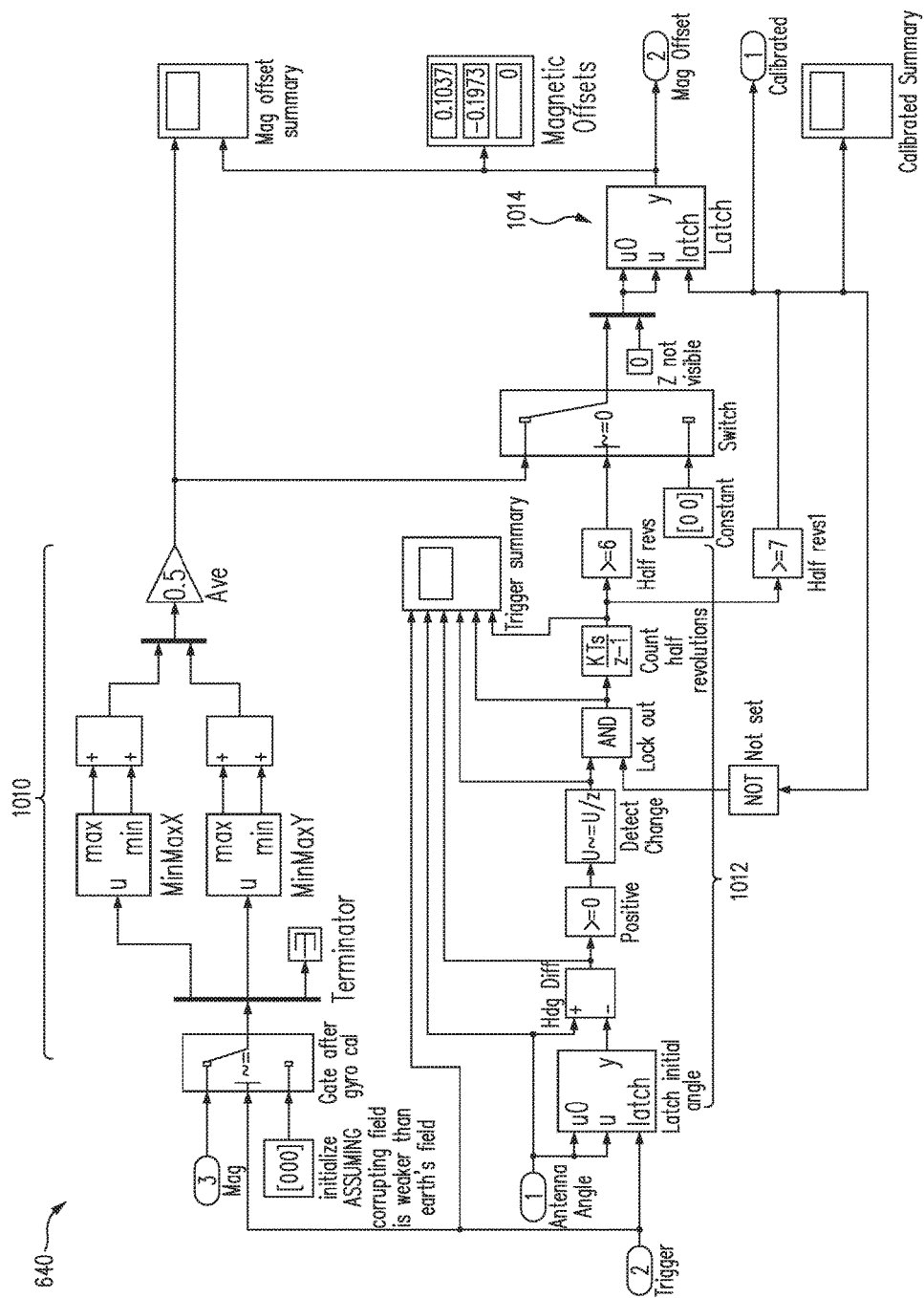
FIG. 10 illustrates a bottom-level view of a rotating orientation and/or position sensor calibration system in accordance with an embodiment of the disclosure.

FIG. 8 illustrates a bottom-level view of an OPS calibration system in accordance with an embodiment of the disclosure. As shown in FIG. 8, block 734 (e.g., also shown in FIG. 7) may be implemented as a latch used to store signal states until unlatched, as shown. FIG. 9 also illustrates a bottom-level view of an OPS calibration system in accordance with an embodiment of the disclosure. As shown in FIGS. 9 and 10, block 740 (e.g., also present in FIG. 7) may be implemented as a mathematical function used to convert the gyro shift due to rotation (e.g., the shift from startup to running) into roll and pitch offsets, which are latched at block 734b as shown.

FIG. 10 illustrates a bottom-level view of an OPS calibration system in accordance with an embodiment of the disclosure. As shown in FIGS. 6 and 10, block 640 (e.g., also shown in FIG. 6) may be configured to calibrate the magnetometer signals just after the gyro calibration in block 630 is complete (e.g., block 630 provides a trigger). In the embodiment shown in FIG. 10, a 2d calibration (e.g., with respect to roll and pitch components x y) for hard iron is estimated from a max capture of the x and y magnetometer channels (e.g., in portion 1010 of block 640) as the antenna structure/platform spins. As shown in portion 1012 and block 1014 of block 640, in some embodiments, the hard iron calibration values may be latched once a number (e.g., a half dozen) revolutions are complete and the calibrated trigger is set.

Looking back at FIG. 6, the results from block 510 are then the gyro roll pitch and yaw components, the magnetometer longitudinal lateral and vertical components, and the accelerometer longitudinal lateral and vertical components, as if the rotation was not present, as shown. In various embodiments, the direction the antenna is pointing may be determined at any time by adding the gyro yaw angle output to the antenna angle signal (e.g., from a shaft encoder).

In various embodiments, corrections for the rotation can either be applied directly or indirectly. The embodiment described herein is considered indirect, where the 9 axes of sensor outputs are compensated for the rotation then passed into block 514 for processing into a yaw, pitch, and roll for mobile structure 101 and/or the non-rotationally actuated portion of an element of system 100 that OPS 190 is integrated with. A direct method embodiment would involve using the 9 axis signals directly to determine antenna RPY without referring to the antenna angle from the shaft encoder, which would require modifying the structure of block 514 to operate in a rotating environment.

In some embodiments, OPS 190 may be implemented with only a single GNSS (e.g., GPS, and/or other global positioning systems) sensor or antenna, for example, which can be used by itself to provide an absolute position and an absolute orientation of a remote sensing imagery system (e.g., referenced to an absolute coordinate frame), particularly in embodiments where the remote sensing imagery system/assembly is able to rotate about an axis and thus be used to provide rotationally corrected orientation and/or position data (e.g., the absolute orientation and position data).

For example, OPS 190 may be implemented using a single patch antenna configured to receive GNSS signals from one, two, or more GNSS satellites substantially simultaneously, and the rotationally corrected orientation and/or position data (e.g., absolute orientation and/or position data) may be derived from the effect of the rotation of OPS 190 on the reception of the GNSS signals. In such embodiments, a remote sensing imagery system may be configured to determine rotationally corrected orientation and/or position data referenced to a mobile structure, a rotationally actuated sensor assembly mounted to the mobile structure, and/or an absolute coordinate frame. In general, full absolute roll, pitch, and yaw coordinates may be derived from reception of GNSS signals from only two GNSS signal sources, but additional GNSS signal sources may be used to increase the overall accuracy and/or bandwidth of the measurements. In some embodiments, overall accuracy and/or bandwidth of the measurements may be increased by including additional orientation, position, acceleration, and/or other data provided by additional sensors mounted to or within a remote sensing imagery system assembly, such as adjacent to and/or integrated with OPS 190.

To explain, in conventional systems, velocity, position and orientation sensors are used with radars (e.g., and other remote sensing imagery systems) to associate the external world sensed by the radar antenna to a vessel's orientation, position and velocity. Conventionally, the orientation of the radar image is provided relative to the antenna, and the orientation of the antenna to the outside world is determined by combining the azimuth of the antenna and the orientation of the vessel. A conventional system calculates the antenna's azimuth from the angle of the antenna, relative to the radar housing, by accumulating index pulses produced from a change of azimuth angle of the antenna relative to the radar housing and an antenna revolution sensor. The offset between the radar housing and the coordinate frame of the vessel must be calibrated, which typically requires a sea-trial to be performed when the equipment is installed. However, in conventional system, the offset calibration accuracy can be relatively poor.

For example, radar image data obtained as the antenna rotates is tagged with the antenna orientation relative to the vessel and vessel's heading before the radar data is sent to the display or used to calculate tracking information (e.g., ARPA or MARPA). When the vessel makes a turn, or is deflected from a steady heading, the variable delay in receiving the data of the ships heading data (e.g., the sensor latency), particularly when received over a data network from a sensor mounted elsewhere on the vessel, introduces errors in the calculation of the absolute orientation of the radar image. The result is that a ground stabilized radar image does not present as a steady image, or radar images are incorrectly aligned when overlaid on a chart, or the course and/or speed of a tracked target is incorrectly estimated.

For instance, the rate of rotation of a typical radar antenna could be 20 degrees per second. Heading data for a mobile structure may be updated at approximately 10 Hz. Thus, the calculation of the antenna orientation can be +/−1 degree in error, assuming there are no additional delays elsewhere in the system between the sensor and radar, within either, or included in the calculation. In another example, the offset calibration is often performed by measuring an apparent bearing to a known target and adjusting the offset until the bearing agrees with the known bearing. For a radar antenna beamwidth of 5 degrees, the offset can be in error by the beamwidth. Thus the total error can be +/−6 degrees, if the system latency is included. Accordingly, a target at a distance of 10 nautical miles could appear to be displaced laterally by +/−1 nautical miles relative to its charted or known position.

Orientation sensors placed elsewhere in the vessel, other than in the remote sensing imagery system housing, require one or more additional housings, power supplies, processors, data cables, and power cables, and would typically be subject to intense electromagnetic radiation when swept by the active aperture of an antenna, as would orientation sensors placed within, and fixed to, the non-rotating part of the housing. Such radiation likely upsets the sensitive circuitry within the orientation sensors, giving rise to further errors in the sensor data. For example, a conventional GPS compass uses two or three GPS sensors fixed to the rigid body of the vessel. Operation of such sensors would be disturbed by the effects of close proximity to and/or being swept by electromagnetic radiation from a rotating ranging sensor antenna, and increasing the number of separately-installed sensors increases the complexity and cost of the overall system.

Embodiments of the present disclosure provide a single rotating GNSS (RGNSS) sensor that can be configured to determine an absolute orientation and/or position of mobile structure 101. For example, the OPS 190 and/or various controllers (e.g., controllers 130 or 220, and/or other controllers) may be configured to measure a phase modulation of a GNSS carrier signal caused by offset rotation about an axis, such as offset rotation of OPS 190 about axis 313, which can change the distance of OPS 190 relative to a GNSS transmitter/satellite substantially enough to measurably modulate the phase of the corresponding GNSS carrier signal. Based on one or more of the diameter of the offset rotation, the rotational frequency of the rotation, and the angle of the offset rotation relative to housing 311, coupled with the phase modulation and the known absolute position of the satellite (e.g., provided by the GNSS signal), remote sensing imagery system 300 may be configured to determine an absolute orientation and/or position of antenna 364, for example.

A single GNSS antenna that rotates with and is outside the aperture of antenna 364 is less expensive to manufacture (e.g., requires less shielding and interference rejection) and is less subject to interference caused by electromagnetic radiation produced by antenna 364. Moreover, as described herein, such OPS 190 can share the enclosure and power supply of system 300. In addition, rotating OPS 190 through at least 180 degrees can help reduce multipath effects (e.g., GNSS signal degradation), provided the period of rotation is fast relative to the rotation of the vessel about its yaw axis (e.g., at least 5 or 10 times as fast), and provided that the multipath effects are relatively constant over the rotational period of the antenna.

Radar antennas of watercraft typically rotate at 20 RPM or more, and so the RGNNS sensor azimuth bandwidth, in the presence of severe multipath interference, can be limited to a relatively slow 12 degrees per second (e.g., approximately one tenth the radar antenna rotation rate). Typically, such low azimuth bandwidth would be inadequate to meet the standard for high speed vessels, but it would suffice for most other vessels or any vessels operated at more moderate speeds (e.g., producing yaw, pitch, and/or roll rates less than 12 degrees per second). In some embodiments, the sensor bandwidth can be improved by adding a 3-axis gyroscope/accelerometer and combining the sensor data as discussed in various embodiments described herein.

As such, embodiments of the present disclosure including an OPS implemented solely with a single GNSS sensor and/or antenna (e.g., capable of receiving one or two GNSS signals from corresponding one or two GNSS signal sources/satellites) share the advantages described herein with respect to co-locating the OPS with the ranging sensor and thus being relatively immune to errors due to system latency. Furthermore, knowledge of the position of the ranging sensor system allows simply overlay of ranging imagery on a chart, and allows integration of, for example, radar, chart and AIS information on the same display. For example, integration of AIS data with radar data allows embodiments to compare cooperative targets (e.g., those providing AIS data) against non-cooperative targets. In some embodiments, a remote sensing imagery system may be configured to use such comparison to highlight remote sensing returns (e.g., radar returns) that do not correspond to an AIS target, such as to highlight potential navigational safety risks, for example, and/or to allow removal of remote sensing returns (e.g., raw radar data) for targets known from the AIS data, and thus to de-clutter a displayed image. In related embodiments, AIS targets that depart from their published course could be highlighted (e.g., displayed in bold or bright colors, such as red or yellow, in blinking graphics, or otherwise highlighted) as potential navigational security risks.

Embodiments of the present disclosure can thus provide accurate and reliable remote sensing imagery. Such embodiments may be used to provide sonar, radar, and/or other remote sensing imagery to assist in navigation for a mobile structure, survey of a body of water, and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a logic device configured to communicate with an orientation and/or position sensor (OPS) rotationally coupled to a mobile structure, wherein the logic device is configured to:
   receive orientation and/or position data from the OPS while the OPS is rotating relative to the mobile structure; and
   determine rotationally corrected orientation and/or position data referenced to the mobile structure, a rotationally actuated sensor assembly mounted to the mobile structure, and/or an absolute coordinate frame, wherein the rotationally corrected orientation and/or position data is based, at least in part, on the received orientation and/or position data.

2. The system of claim 1, further comprising the rotationally actuated sensor assembly, wherein the rotationally actuated sensor assembly comprises a remote sensor assembly coupled to the mobile structure, the OPS is mounted within a housing of the remote sensor assembly, and the logic device is configured to:
   transmit remote sensor beams using the remote sensing assembly;
   receive remote sensor returns corresponding to the rotationally corrected orientation and/or position data; and
   generate remote sensor image data based on the remote sensor returns and the rotationally corrected orientation and/or position data.

3. The system of claim 2, wherein:
   the OPS comprises a global navigation satellite system sensor;
   the remote sensor assembly comprises a radar assembly;
   the radar assembly comprises a radar antenna, the OPS, and an actuator;

the actuator is configured to rotate the radar antenna and/or the OPS about an axis of the radar assembly while the remote sensor returns are received by the logic device; and the rotational corrected orientation and/or position data comprises an absolute orientation of the radar antenna referenced to the absolute coordinate frame.

4. The system of claim 2, further comprising a display in communication with the logic device, wherein the OPS comprises one or more of an accelerometer, a gyroscope, a GNSS, a magnetometer, a float level, and/or a compass, wherein the logic device is configured to:

render the remote sensor image data using the display, wherein the rendered remote sensor image data is referenced to the absolute coordinate frame and/or a coordinate frame of the mobile structure.

5. The system of claim 1, wherein the logic device is configured to:

determine a mounting angle offset between a reference frame for the OPS and a rotational axis corresponding to rotational motion of the OPS; and transform the received orientation and/or position data using the mounting angle offset to align the transformed orientation and/or position data to the rotational axis.

6. The system of claim 5, wherein the logic device, for the determine the mounting angle offset, is configured to:

determine roll and pitch components of a shift in a gyroscope portion of the received orientation and/or position data that corresponds to the OPS transitioning from a non-rotating state to a rotating state; and combine the roll and pitch components to form the mounting angle offset.

7. The system of claim 1, wherein the logic device is configured to:

receive angles of rotation for the OPS corresponding to the received orientation and/or position data;

determine a rotational velocity for the OPS based on the received angles of rotation; and remove the rotational velocity from a corresponding component of a gyroscope portion of the received orientation and/or position data to determine a rotationally corrected gyroscope portion of the received orientation and/or position data.

8. The system of claim 1, wherein the logic device is configured to:

receive an angle of rotation for the OPS corresponding to the received orientation and/or position data;

determine a magnetic offset based, at least in part, on a magnetometer portion of the received orientation and/or position data;

determine a calibrated magnetometer portion by removing the magnetic offset from the magnetometer portion; and rotate the calibrated magnetometer portion in a direction opposite to the received angle of rotation to determine a rotationally corrected magnetometer portion of the received orientation and/or position data.

9. The system of claim 1, wherein the logic device is configured to:

receive an angle of rotation for the OPS corresponding to the received orientation and/or position data; and rotate an accelerometer portion of the received orientation and/or position data in a direction opposite to the received angle of rotation to determine a rotationally corrected accelerometer portion of the received orientation and/or position data.

10. A method comprising:

receiving orientation and/or position data from an orientation and/or position sensor (OPS) rotationally coupled to a mobile structure while the OPS is rotating relative to the mobile structure; and determining rotationally corrected orientation and/or position data referenced to the mobile structure, a rotationally actuated sensor assembly mounted to the mobile structure, and/or an absolute coordinate frame, wherein the rotationally corrected orientation and/or position data is based, at least in part, on the received orientation and/or position data.

11. The method of claim 10, wherein the rotationally actuated sensor assembly comprises a remote sensor assembly coupled to the mobile structure, and the OPS is mounted within a housing of the remote sensor assembly, the method further comprising:

transmitting remote sensor beams using the remote sensing assembly;

receiving remote sensor returns corresponding to the rotationally corrected orientation and/or position data; and generating remote sensor image data based on the remote sensor returns and the rotationally corrected orientation and/or position data.

12. The method of claim 11, wherein:

the remote sensor assembly comprises a radar assembly;

the OPS comprises one or more of an accelerometer, a gyroscope, a GNSS, a magnetometer, a float level, and/or a compass;

the radar assembly comprises a radar antenna, the OPS, and an actuator; and the actuator is configured to rotate the radar antenna and/or the OPS about an axis of the radar assembly while the remote sensor returns are received by the logic device.

13. The method of claim 11, further comprising:

rendering the remote sensor image data, wherein:

the OPS comprises a global navigation satellite system sensor;

the rotational corrected orientation and/or position data comprises an absolute orientation of at least a portion of the remote sensing assembly referenced to the absolute coordinate frame; and the rendered remote sensor image data is referenced to the absolute coordinate frame and/or a coordinate frame of the mobile structure.

14. The method of claim 10, further comprising:

determining a mounting angle offset between a reference frame for the OPS and a rotational axis corresponding to rotational motion of the OPS; and transforming the received orientation and/or position data using the mounting angle offset to align the transformed orientation and/or position data to the rotational axis.

15. The method of claim 14, wherein the determining the mounting angle offset comprises:

determining roll and pitch components of a shift in a gyroscope portion of the received orientation and/or position data that corresponds to the OPS transitioning from a non-rotating state to a rotating state; and combining the roll and pitch components to form the mounting angle offset.

16. The method of claim 10, further comprising:

receiving angles of rotation for the OPS corresponding to the received orientation and/or position data;

determining a rotational velocity for the OPS based on the received angles of rotation; and removing the rotational velocity from a corresponding component of a gyroscope portion of the received orientation and/or position data to determine a rotationally corrected gyroscope portion of the received orientation and/or position data.

17. The method of claim 10, further comprising:

receiving an angle of rotation for the OPS corresponding to the received orientation and/or position data;

determining a magnetic offset based, at least in part, on a magnetometer portion of the received orientation and/or position data;

determining a calibrated magnetometer portion by removing the magnetic offset from the magnetometer portion; and rotating the calibrated magnetometer portion in a direction opposite to the received angle of rotation to determine a rotationally corrected magnetometer portion of the received orientation and/or position data.

18. The method of claim 10, further comprising:

receiving an angle of rotation for the OPS corresponding to the received orientation and/or position data; and rotating an accelerometer portion of the received orientation and/or position data in a direction opposite to the received angle of rotation to determine a rotationally corrected accelerometer portion of the received orientation and/or position data.

* * * * *

UNITED STATES PATENT AND TRADEMARK OFFICE
CERTIFICATE OF CORRECTION

PATENT NO. : 10,261,176 B2
APPLICATION NO. : 15/445717
DATED : April 16, 2019
INVENTOR(S) : Mark Johnson, Paul Stokes and Richard Jales Page 1 of 1

It is certified that error appears in the above-identified patent and that said Letters Patent is hereby corrected as shown below:

In the Specification

In Column 4, Line 30, change "the than of" to --the form of--.

In Column 7, Line 15, change "OP S" to --OPS--.

In Column 8, Line 34, change "teem" to --term--.

In Column 16, Line 67, change "GP S" to --GPS--.

In Column 23, Line 38, change "system 100E" to --system 100B--.

In Column 29, Line 30, change "OP S" to --OPS--.

Signed and Sealed this
Fourteenth Day of April, 2020

Andrei Iancu
*Director of the United States Patent and Trademark Office*